(12) United States Patent
Oliver

(10) Patent No.: US 10,844,894 B2
(45) Date of Patent: Nov. 24, 2020

(54) ROTATING TENSION LATCH

(71) Applicant: Javier E. Oliver, Dallas, TX (US)

(72) Inventor: Javier E. Oliver, Dallas, TX (US)

( * ) Notice: Subject to any disclaimer, the term of this patent is extended or adjusted under 35 U.S.C. 154(b) by 387 days.

(21) Appl. No.: 15/620,199

(22) Filed: Jun. 12, 2017

(65) Prior Publication Data

US 2017/0276161 A1 Sep. 28, 2017

Related U.S. Application Data

(63) Continuation-in-part of application No. 13/652,976, filed on Oct. 16, 2012, now Pat. No. 9,677,590.

(51) Int. Cl.
*F16B 21/02* (2006.01)
*F16B 21/04* (2006.01)

(52) U.S. Cl.
CPC ......... *F16B 21/04* (2013.01); *Y10T 403/7005* (2015.01)

(58) Field of Classification Search
CPC .... F16B 5/10; F16B 7/20; F16B 21/02; F16B 21/04; F16B 21/09; Y10T 403/7005; Y10T 403/7007
See application file for complete search history.

(56) References Cited

U.S. PATENT DOCUMENTS

| 2,799,344 A | 7/1957 | Muse |
|---|---|---|
| 3,072,430 A | 1/1963 | Fahrenwald |
| 3,211,479 A | 10/1965 | Brown |
| 4,483,563 A | 11/1984 | van der Heyden |
| 5,466,020 A | 11/1995 | Page et al. |
| 6,877,778 B2 | 4/2005 | Froment et al. |
| 8,057,121 B2 | 11/2011 | Gallagher |
| 2006/0189961 A1 | 8/2006 | Miyahara |

FOREIGN PATENT DOCUMENTS

| DE | 19922618 A1 | 7/2000 | |
|---|---|---|---|
| EP | 0636215 B1 | 9/2002 | |
| GB | 1 528 754 | * 10/1978 | ............. F16B 21/04 |
| WO | 2006021561 A2 | 3/2006 | |

* cited by examiner

*Primary Examiner* — Michael P Ferguson

(57) ABSTRACT

A female latch member comprising a main body having an aperture with a central axis and an inside surface. The female latch member further includes a first upper portion and second, third and fourth lower portions extending radially from said inside surface that cooperate to form first, second and third channels, each of said first, second and third channels having in order a first vertical upper limit, a second vertical lower limit, and a third vertical upper limit, said first, second and third channels configured to receive three related pins of a male hook member and cause said female latch member to rotate relative to said male hook member. The female latch member further includes a floating bearing assembly attached to the main body, the floating bearing configured to allow for rotation and at least one of parallel, angular or axial movement of the main body.

20 Claims, 25 Drawing Sheets

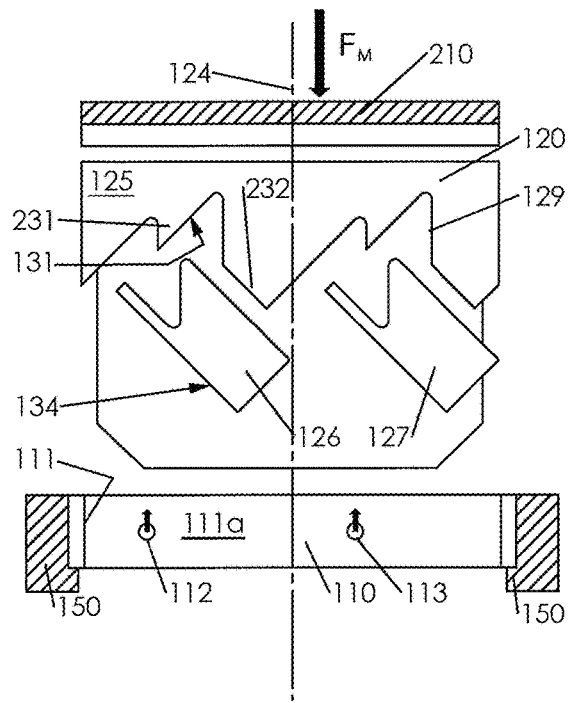
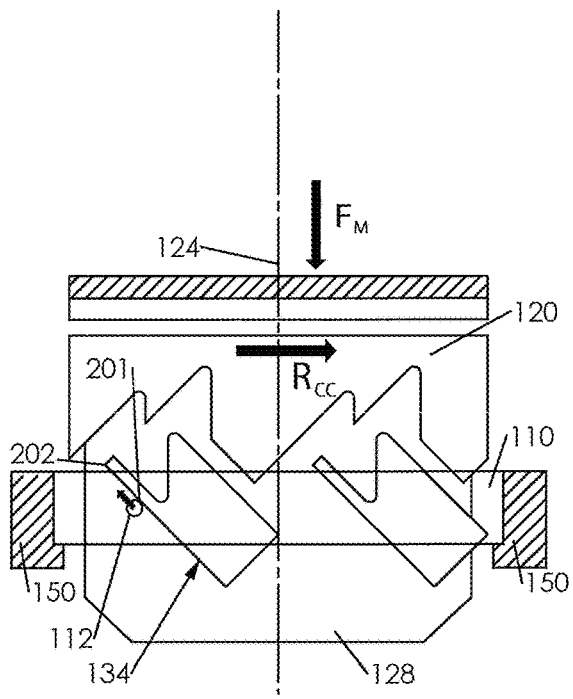
FIG. 2A
FIG. 2B
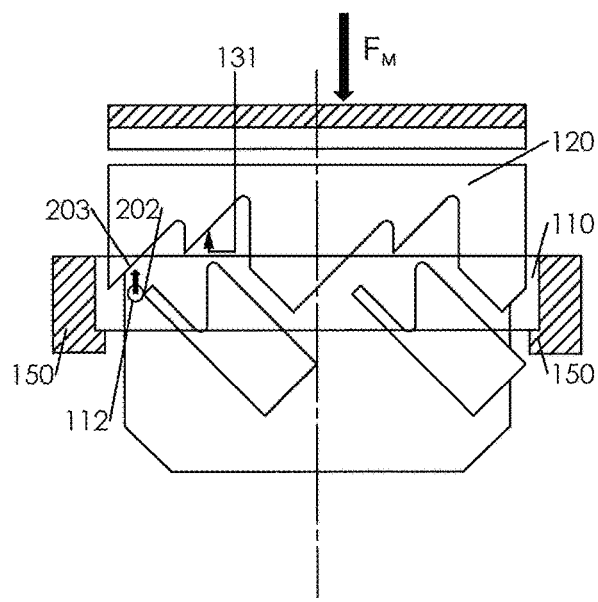
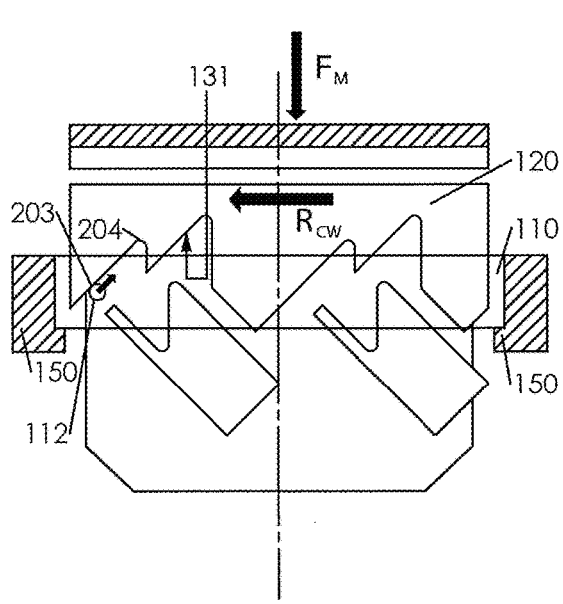
FIG. 2C
FIG. 2D

US 10,844,894 B2

ROTATING TENSION LATCH

CROSS-REFERENCE TO RELATED APPLICATIONS

This application is a continuation-in-part of U.S. application Ser. No. 13/652,976 filed on Oct. 16, 2012, entitled "ROTATING TENSION LATCH," commonly assigned with the present invention and incorporated herein by reference.

TECHNICAL FIELD

This application is directed, in general, to a coupling device or latch and, more specifically, to a rotating tension latch.

BACKGROUND

Fasteners are ubiquitous. A quick trip to the hardware section of any home center will readily reveal the broad selection of fasteners. Screws, bolts, rivets, wall anchors, cotter pins, magnets, latches, etc., serve to enable one object to be fastened permanently or temporarily to another object. Seemingly, the choices are so broad that there is likely a specific fastener for every specific application.

Many assembly line operations use fasteners, such as bolts or screws, to couple two separate parts together. However, in many automated assembly line operations it is desirable to grasp an assembly with a robotic arm and temporarily relocate the assembly to the next station where assembly continues. In some applications magnetic or vacuum forces are employed to grasp the assembly for transport. However, in some applications magnetic forces may be undesirable because of the nature of the assembly which may be adversely affected by magnetism. Similarly, other assemblies may be unsuitable for the use of vacuum force because of insufficient area to affect a secure grasp of the assembly, excessive weight of the workpiece, etc. Therefore, there is needed a simple and re-useable mechanical fastener that may be employed in these and other suitable applications.

BRIEF DESCRIPTION

Reference is now made to the following descriptions taken in conjunction with the accompanying drawings, in which:

FIGS. 2A-2M are a series of elevation views of a periphery of a male latch member and sectional views of a corresponding female hook member in a progression from unlocked to locked in tension to unlocked;

DETAILED DESCRIPTION

Figure 1:
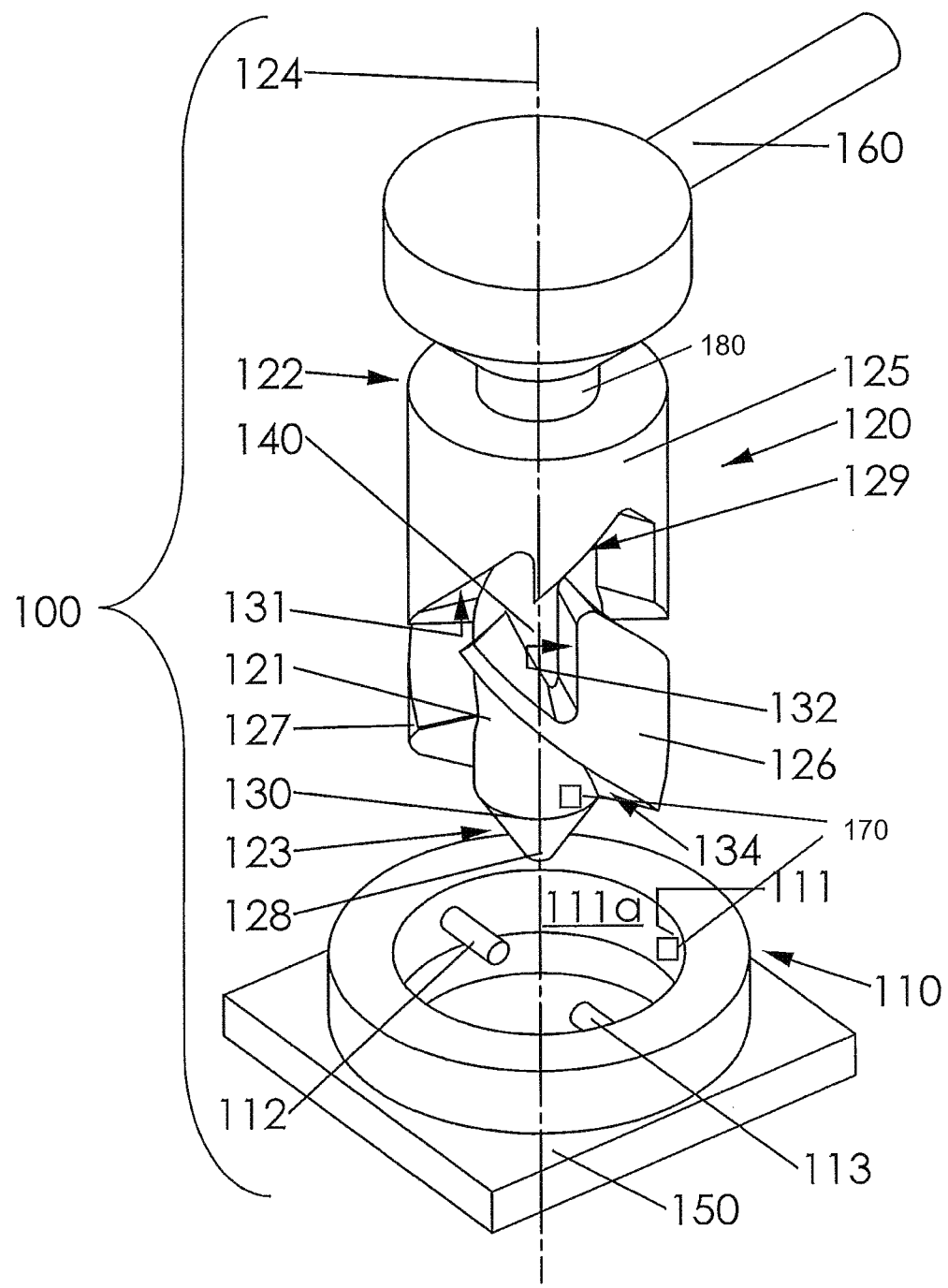
FIG. 1 is an exploded isometric view of one embodiment of a rotating tension latch constructed according to the principles of the present disclosure.

Referring initially to FIG. 1, illustrated is an exploded isometric view of one embodiment of a rotating tension latch 100 constructed according to the principles of the present disclosure. For the purposes of this discussion, the operating principles of a rotating tension latch 100 of FIG. 1 will be explained with respect to a female hook member 110 and a male latch member 120. The female hook member 110 includes a central aperture 111 having an inner surface 111a and first and second pins 112, 113, respectively. In the illustrated embodiment, the first and second pins 112, 113, respectively, extend radially inward from the inner surface 111a into the central aperture 111 and are diametrically opposed. For balance, and to limit rotation between unlocked and tension locked positions, the present embodiment includes both first and second pins 112, 113, respectively, spaced apart by 180° around the inner surface 111a of the female hook member 110. In an alternative embodiment, the female hook member 110 may include only a single pin, for example the first pin 112. In yet another embodiment, the female hook member 110 may include three or more pins. In such embodiments, it is advantageous that the pins be distributed evenly around the inner surface 111a; for example, three pins are evenly distributed with 120° between adjacent pins; four pins are evenly distributed with 90° between adjacent pins, etc.

The male latch member 120, in one embodiment, includes a core 121 having a first end 122; a second end 123; a central axis 124; first, second and third portions 125-127, respectively; and a cone 128. The cone 128 may be truncated as shown. The core 121, in this embodiment, is substantially-cylindrical around the central axis 124 and comes to a blunt point or a truncated cone 128. Such a truncated cone 128 form may also be referred to as chamfered. The first, second and third portions 125-127, respectively, are solid masses contiguous to the core 121 that limit the vertical travel of the first pin 112 when the male latch member 120 is inserted into the female hook member 110. Note that the initial angular (rotated) relationship of the female hook member 110 (and therefore also the first and second pins 112, 113, respectively,) to the male latch member 120 is unimportant, as the male latch member 120 and the female hook member 110 will self-align with the aid of the chamfered/truncated cone 128.

For the purposes of this disclosure, vertical movement is defined as along the central axis 124 of the male latch member 120. Of course, one of skill in the pertinent art will recognize that this "defined vertical" may vary from "absolute local vertical" of the location wherein the tension latch 100 is employed.

In this embodiment, the first portion 125 is proximate the first end 122 and extends radially outward from the core 121. The first portion 125 has a first irregular surface 131 proximate a midpoint 140 of the core 121. The first irregular surface 131, in the illustrated embodiment, is perpendicular to the central axis 124 and has an edge 129 that is saw tooth-like. The first irregular surface 131 defines a vertical limit as a bearing surface that the first pin 112 may travel along the core 121 while the male latch member 120 is inserted into the female hook member 110. The first portion 125 is continuous around the core 121 so that the first and second pins 112, 113 may not pass vertically beyond the first irregular surface 131.

The second portion 126 is proximate the second end 123 and extends radially outward from the core 121. The second portion 126 has a second irregular surface 132 proximate the midpoint 140 that, in this embodiment, is also perpendicular to the central axis 124. The first and second irregular surfaces 131, 132, respectively, form an irregular channel 133 there between that is configured to guide one of the first and second pins 112, 113, respectively, around at least a portion of a periphery 130 of the core 121. The channel 133 is "irregular" in that the width of the channel 133 between the first and second irregular surfaces 131, 132, respectively, varies with the location around the periphery of the core 121. The second portion 126 also has a third irregular surface 134 proximate the second end 123. The third portion 127, in this embodiment, is similar to, and positioned 180° around the core 121 from, the second portion 127. The third portion 127 together with the first portion 125 forms a second channel (not visible) that is substantially identical to the first channel 133. The second and third portions 126, 127, respectively, are evenly distributed around the core 121, and therefore the first channel 133 and the second channel are evenly distributed around the core 121. Similarly, the first and second pins are evenly distributed around the inner surface 111a of the female hook member 110.

In one embodiment, the female hook member 110 may be fixed to or part of a workpiece 150 and the male latch member 120 may be rotatably coupled around the central axis 124 to a positioning arm 160. The motion of the positioning arm 160 may be controlled by an automated machine (not shown). One of skill in the pertinent art is familiar with conventional methods to rotationally couple the male latch member 120 to the positioning arm 160 and how an automated machine may be made to place the male latch member 120 in a desired position relative to the female hook member 110.

For ease of illustration and understanding of the principles of the present device, the female hook member 110 will be considered fixedly coupled to a workpiece 150 and the male latch member 120 will be moveable vertically with respect to the female hook member 110 as well as capable of rotation with respect to the female hook member 110. This vertical movement along the central axis 124 may be referred to as "reciprocation" as the rotating tension latch operates first in a downward motion and then an upward motion followed by a second downward motion. This combination of linear motions together with rotation of the male latch member 120 causes the tension latch 100 to move from unlatched, to a momentarily latched, to an unlatched condition. Of course, momentarily does not mean only for a very limited time, as the rotating tension latch 100 will maintain the latched condition so long as tension remains between the female hook member 110 and the male latch member 120.

Figure 2E:
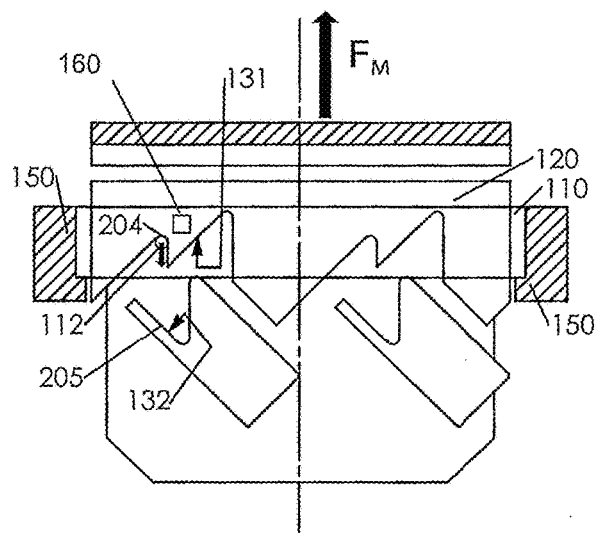

Referring now to FIG. 2A-2M, illustrated is a series of elevation views of the periphery of the male latch member 120 and a sectional view of the female hook member 110. That is, the side surfaces (periphery) of the male latch member 120 show the first, second, and third portions 125, 126, 127, respectively, flattened out to form a planar view of the outer surface of the male latch member 120. This provides a more easily understood view showing the progress of the interaction of the first and second pins 112, 113, respectively, with the contours of the male latch member 120. In the series of elevation views, FIG. 2A-2M, the female hook member 110 will be shown in a fixed vertical location until the tension latch 100 engages in FIG. 2G and the position of the male latch member 120 will be positioned vertically relative to the female hook member 110 as befits the interaction of the female hook member 110 and the male latch member 120 in FIG. 2H. This demonstrates how the tension latch 100 may be used to move a workpiece having a female hook member embedded or applied thereto. Only the first pin 112 will be shown in subsequent FIGURES for simplicity. One of skill in the pertinent art will recognize that the second pin 113 interacts with the third portion 127 in the same manner as the first pin 112 interacts with the second portion 126. One of skill in the pertinent art will further recognize the saw tooth-like profile of the first irregular surface 131 (having an edge 129) which has alternating short and long teeth 231, 232 respectively, as shown in FIG. 2A.

Continuing now with FIG. 2A with continuing reference to FIG. 1, an attachment 210 of the positioning arm 160 (not shown in these views) places the male latch member 120 vertically proximate the female hook member 110. The first pin 112 is randomly positioned with respect to the workpiece 150 and the male latch member 120, as would be the case in a manufacturing production line. In these figures, the first pin 112 is represented by its cross section as a small circle. The central axis 124 is approximately aligned with a center of the central aperture 111 (FIG. 1). The male latch member 120 is aligned with, but not in contact with, the female hook member 110 at this point. The female hook member 110 is fixed with respect to the workpiece 150 in this example. A vertical downward force $F_M$ is applied to the male latch member 120. In one embodiment, this downward force $F_M$ may be applied by the positioning arm 160 (not shown) through the attachment 210. In this embodiment, the male latch member 120 is free to rotate as necessary around the central axis 124 even as the downward force $F_M$ is applied.

In an alternative embodiment, the male latch member 120 may be positioned by a flexible attachment 120 such as a cable (not shown). In that embodiment, gravity acting on the male latch member 120 may be used as a force to latch and unlatch the male latch member 120 to the female hook member 110. Of course, one who is of skill in the art will realize that tool tolerances for a gravity-operated device must be carefully considered for reliable operation.

FIG. 2B shows the male latch member 120 advanced vertically downward toward the central aperture 111 with the chamfered end or truncated cone 128 assisting in correcting for non-alignment of the central aperture 111 and the central axis 124. In the illustrated embodiment, the first pin 112 contacts a point 201 on the third irregular surface 134 and the male latch member 120 rotates counter-clockwise $R_{cc}$ (when viewed from above) or left to right as in FIG. 2B as the male latch member 120 advances downward toward the female hook member 110. As the male latch member 120 further advances toward the female hook member 110 and rotates, the first pin 112 moves toward a point 202 on the third irregular surface 134.

FIG. 2C shows the male latch member 120 rotated and advanced so that the first pin 112 is at the point 202 on the third irregular surface 134. The male latch member 120 continues to advance toward the female hook member 110, but ceases rotation for a moment, as the first pin 112 moves toward a point 203 on the first irregular surface 131.

FIG. 2D shows the male latch member 120 advanced so that the first pin 112 is at the point 203 on the first irregular surface 131. The male latch member 120 continues to advance toward the female hook member 110, but now rotates clockwise $R_{cw}$ from above (right to left in the FIG.), and the first pin 112 moves toward a point 204 on the first irregular surface 131.

FIG. 2E shows the male latch member 120 advanced so that the first pin 112 is at the point 204 on the first irregular surface 131. The male latch member 120 is at its farthest advance toward the female hook member 110 until the two members lock in tension. The male latch member 110 force $F_M$ now reverses to an upward vertical force so that the male latch member 120 moves upward relative to the female hook member 110 and the first pin 112 moves toward a point 205 on the second irregular surface 132.

Figure 2F:
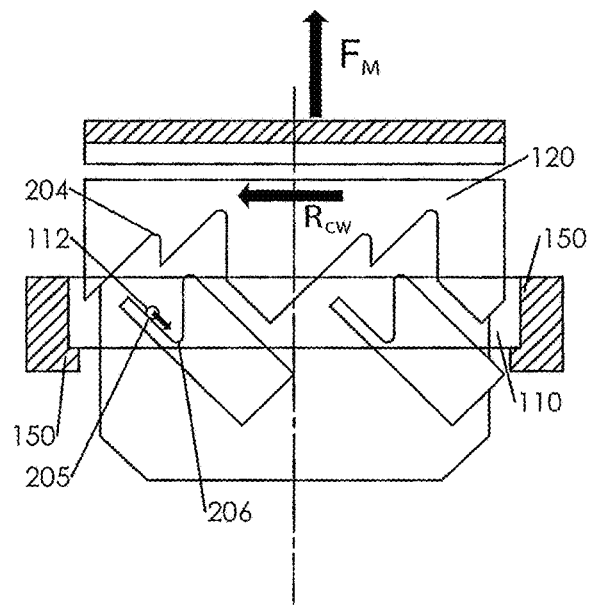

FIG. 2F shows the male latch member 120 withdrawn so that the first pin 112 is at the point 205 on the second irregular surface 132. The male latch member 120 continues to withdraw from the female hook member 110, but now rotates clockwise $R_{cw}$ from above (right to left in the FIG.), and the first pin 112 moves toward a point 206 on the second irregular surface 132.

Figure 2G:
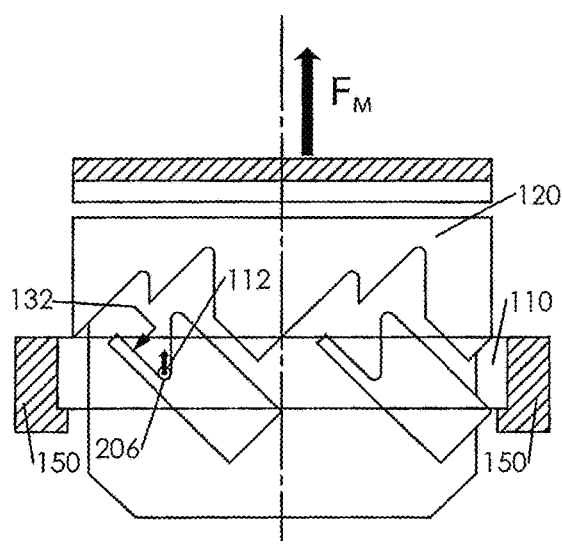

FIG. 2G shows the male latch member 120 withdrawn so that the first pin 112 is captured at the point 206 on the second irregular surface 132. Point 206 includes a concavity configured to capture the first pin 112 in tension between the female hook member 110 and the male latch member 120. The male latch member 120 and the female hook member 110 are now locked in tension and will move vertically or alternatively horizontally, as a single unit so long as there is continuous upward force $F_M$. The latched condition may be termed temporary because the rotating tension latch 100 is intended for the limited amount of time necessary to reposition the workpiece.

Figure 2H:
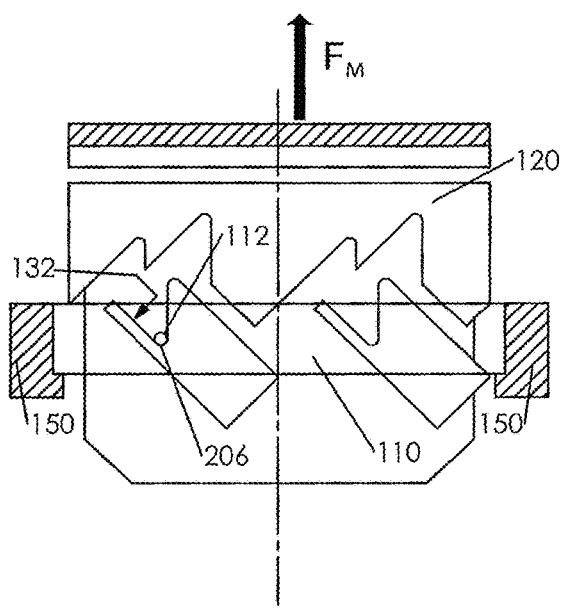

FIG. 2H shows the male latch member 120 withdrawn vertically with the female hook member 110 coupled thereto as well as workpiece 150. The first pin 112 remains captured in tension at point 206. Therefore, workpiece 150 can be relocated as necessary to the next station on the assembly line.

Figure 2I:
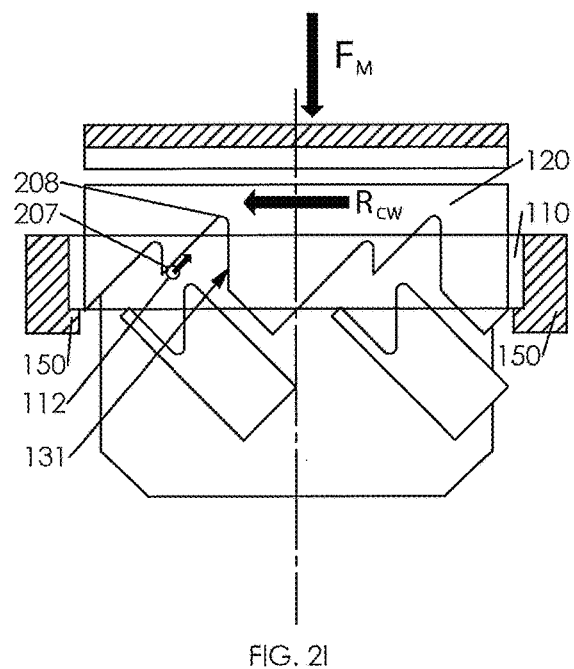

FIG. 2I shows the male latch member 120 located so that the workpiece 150 is at the next station of the assembly line. The workpiece 150, female hook member 110 and male latch member 120 are lowered until the workpiece 150 is in position. At that time, the female hook member 110 and the workpiece resist further movement, and a downward vertical force $F_M$ may be applied to the male latch member 120 releasing tension on the first pin 112. This force $F_M$ causes vertical motion of the male latch member 120 relative to the female hook member 110 and places the first pin 112 at a point 207 on the first irregular surface 131. Continued downward force $F_M$ causes clockwise rotation $R_{CW}$ of the male latch member 120 and movement of the first pin 112 toward a point 208 on the first irregular surface 131. This, in one embodiment, unlocks the male latch member 120 from the female hook member 110.

Figure 2J:
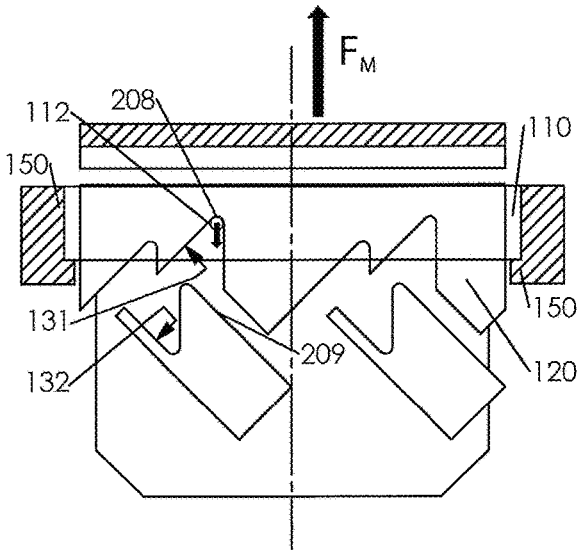

FIG. 2J shows the male latch member 120 advanced so that the first pin 112 is at the point 208 on the first irregular surface 131. Reversing the vertical force $F_M$ causes the male latch member 120 to move vertically relative to the female hook member 110 and the first pin 112 moves toward a point 209 on the second irregular surface 132.

Figure 2K:
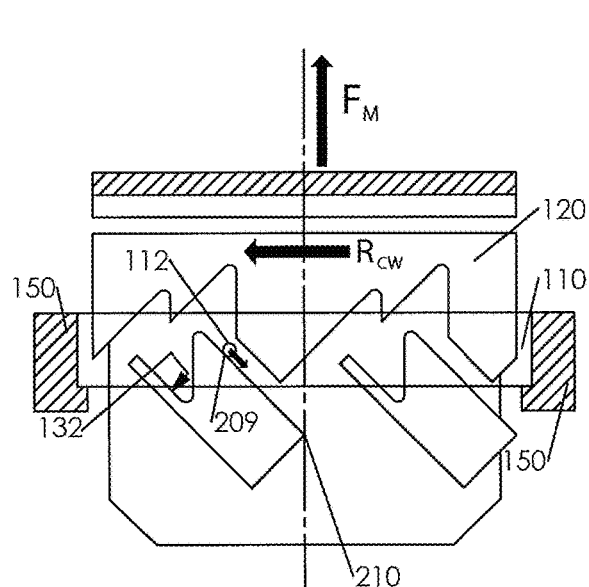

FIG. 2K shows the male latch member 120 withdrawn from the female hook member 110 so that the first pin 112 is at the point 209 on the second irregular surface 132. Continued withdrawal of the male latch member 120 by upward force $F_M$ causes the male latch member 120 to rotate clockwise $R_{CW}$ as the first pin 112 proceeds toward a point 210 on the second irregular surface 132.

Figure 2L:
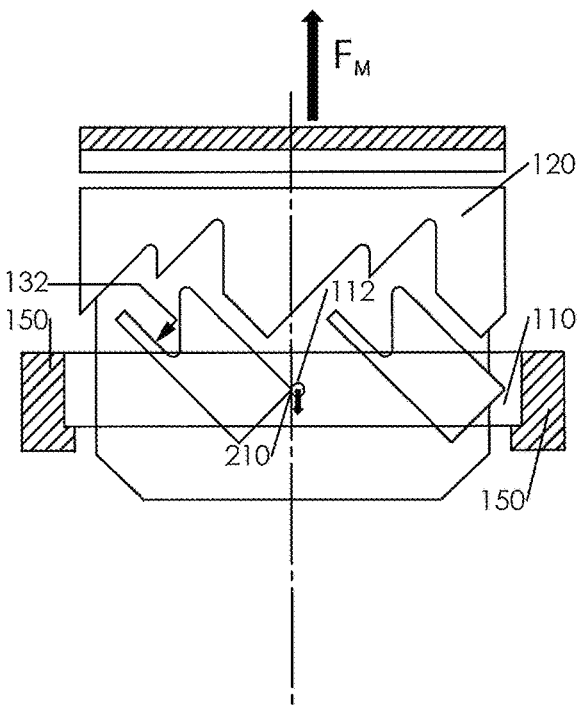

FIG. 2L shows the male latch member 120 withdrawn sufficiently from the female hook member 110 that the first pin 112 is at the point 210 on the second irregular surface 132. Continued withdrawal of the male latch member 120 causes the male latch member 120 to separate completely from the female hook member 110.

Figure 2M:
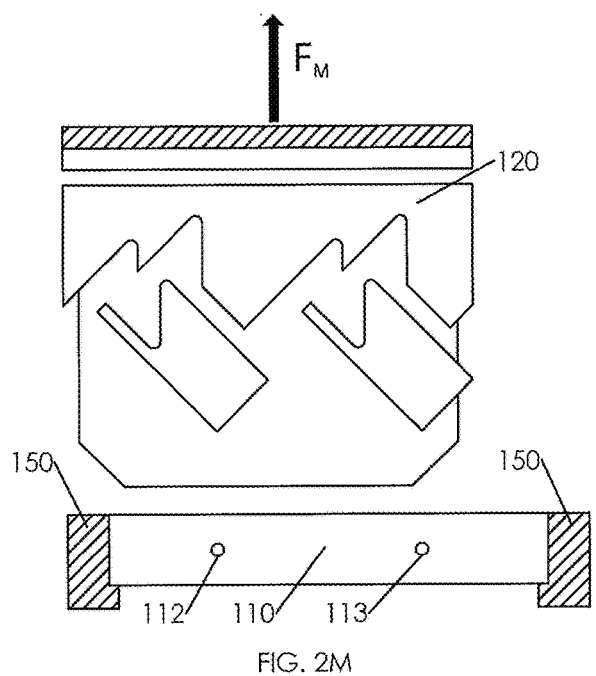

FIG. 2M shows the male latch member 120 completely withdrawn from the female hook member 110.

Figure 2N:
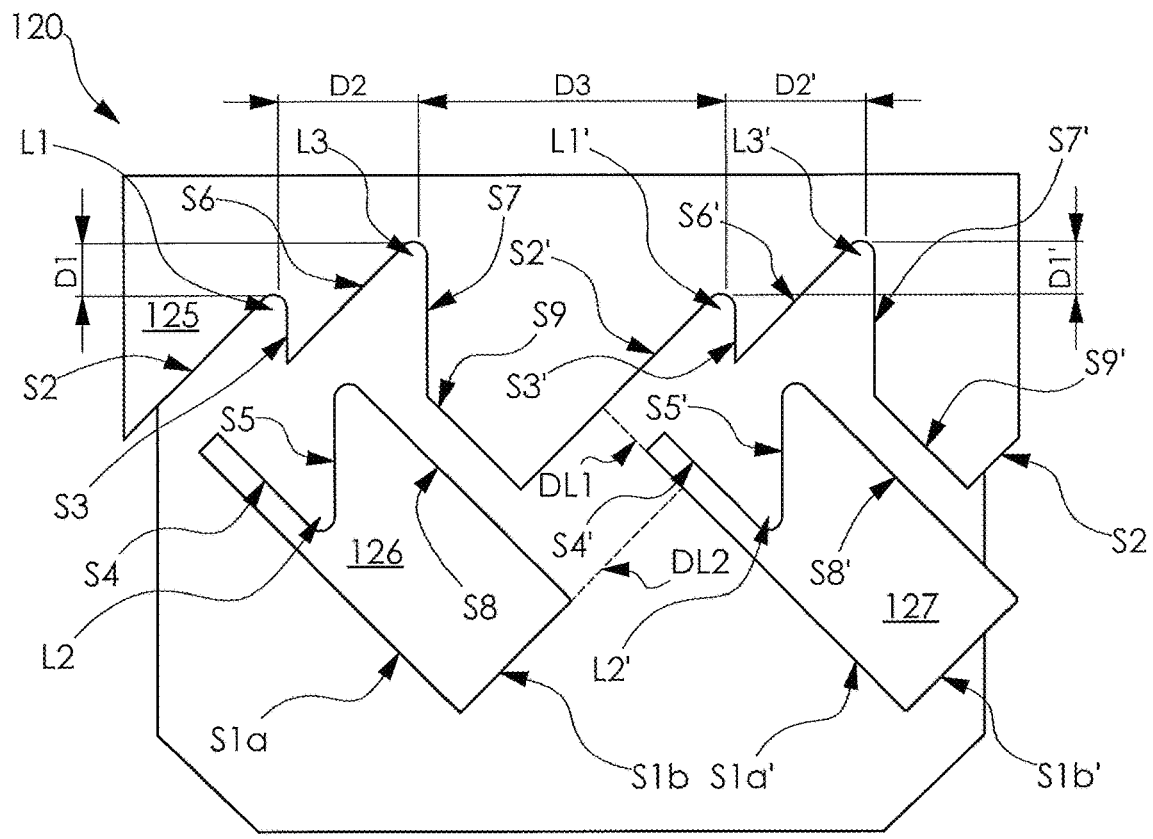
FIGS. 2N and 2P illustrate sectional views of the male latch member 120 of FIGS. 2A-2M.
Figure 2P:
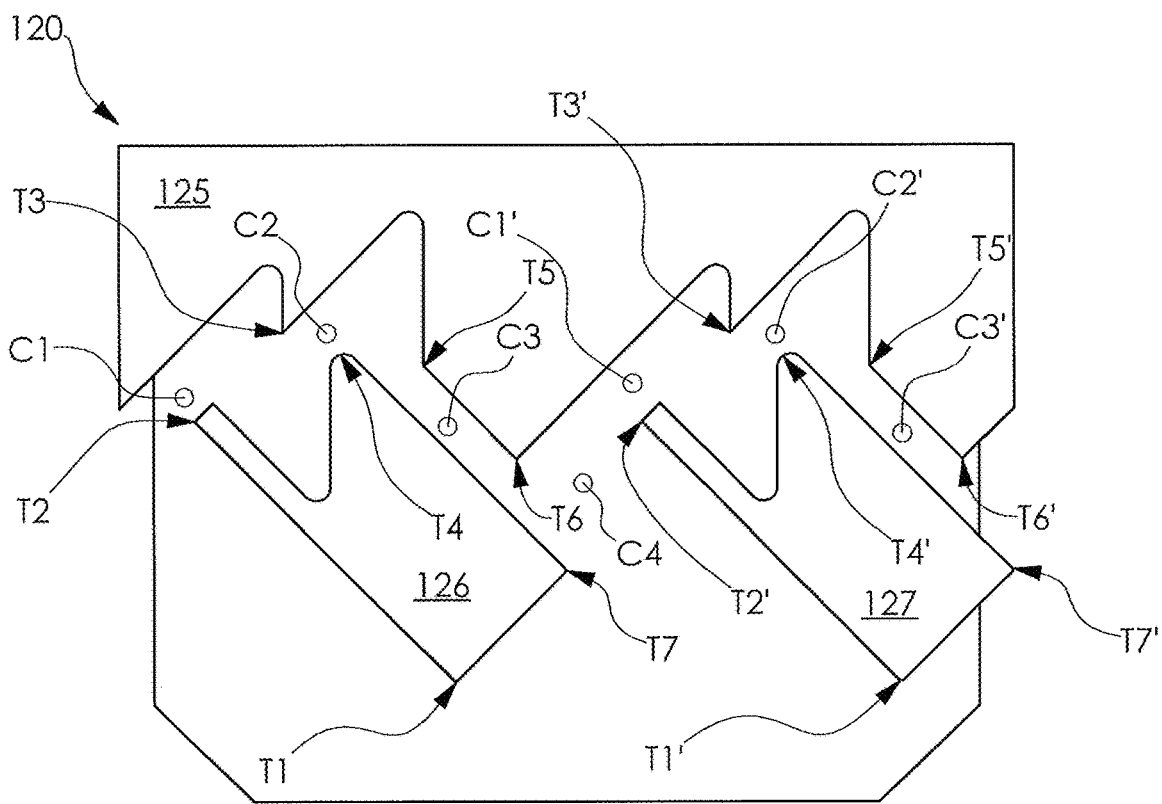

Turning now to FIGS. 2N and 2P, illustrated is a sectional view of the male latch member 120 of FIGS. 2A-2M. FIG. 2N illustrates the various different surfaces (e.g., illustrated with the letter S) and vertical limits (e.g., illustrated with the letter L) of the male latch member 120, and FIG. 2P illustrates the various different transition points (e.g., illustrated with the letter T) and channels (e.g., illustrated with the letter C) of the male latch member 120.

FIGS. 2N and 2P, and the surfaces, vertical limits, transition points, and channels, will be used to further discuss the path that a pin might travel as a male latch member and female hook member would engage and disengage one another. Similarly, the surfaces, vertical limits, transition points, and channels of different paths a pin might take may be delineated from one another by using a combination of letters and numbers (e.g., S1$a$, T1, C1, T1), a combination of letters and numbers with a single prime symbol (e.g., S1$a$', T1', C1', T1'), a combination of letters and numbers with a double prime symbol (e.g., S1$a$", T1", C1", T1"), etc. For example, in a three pin design, a first pin might follow a path delineated without any prime symbol, a second pin might follow a path delineated with a single prime symbol, and a third pin might follow a path delineated with a double prime symbol. Traditionally, the different paths of a given design are substantially identical, if not entirely identical, to one another.

For the purpose of the following discussion, it will be assumed that the male latch member 120 is configured (e.g., allowed) to rotate clockwise and counter-clockwise (e.g., with respect to the female hook member) as may be necessary to operate. In an alternative embodiment, the female hook member might be configured (e.g., allowed) to rotate clockwise and counter-clockwise (e.g., with respect to male latch member) as may be necessary to operate. In yet another embodiment, each of the male latch member and female hook member may be configured (e.g., allowed) to rotate freely with respect to each other.

It should be noted that while the embodiment of FIGS. 2N and 2P illustrate the male latch member 120 having the channels that the pin from the female hook member would engage, the same theory could apply if the female latch member were to have the channels that the pin from the male hook member would engage. Accordingly, the present disclosure should not be limited to one design or the other.

In operation, a pin would typically encounter the second portion 126 either to the left or right of the transition point T1. If the pin were to encounter the upwardly slanting surface S1$a$ of the second portion 126, it would cause the male latch member 120 to rotate counter-clockwise (when viewed from above) and thus the pin would slide upwards until it reaches the transition point T2. After reaching the transition point T2, the pin would travel upward to encounter the upwardly slanting surface S2 of the first portion 125. The upwardly slanting surface S2, in the embodiment shown, slants in an opposite direction as the upwardly slanting surface S1a. When the pin encounters the upwardly slanting surface S2, it causes the male latch member 120 to rotate clockwise (when viewed from above) and thus the pin would travel through the channel C1 and slide upwards until it reaches the vertical upper limit L1. Thus far, the pin has traveled to the vertical upper limit L1 by way of a relative downward force (e.g., an intentional force, gravitational force, etc.) upon the male latch member 120. The term "relative" is used in this instance as the force might be placed upon the male latch member, female hook member, or both of the male latch member and female hook member.

At this point, the pin is locked in the vertical upper limit L1 position until the relative downward force subsides. Exchanging the downward force for an upward force, the pin would travel down the surface S3 (e.g., substantially vertical surface S3 in one embodiment) to the transition point T3. At the transition point T3, the pin would head toward the downwardly slanting surface S4 of the second portion 126. As the pin encounters the downwardly slanting surface S4, it would cause the male latch member 120 to rotate clockwise (when viewed from above) and thus the pin would slide downward until it reaches the vertical lower limit L2. At this point, the female hook member 110, as well as anything attached to it, could be picked up by way of the pin being held in the vertical lower limit L2. This would be considered the "pick" of the "pick and place" process.

The pin may be released from the vertical lower limit L2 of the male latch member 120 by putting relative downward force (e.g., an intentional force, gravitational force, etc.) upon the male latch member 120. As downward force is applied to the male latch member 120, the pin travels up the upward slanting surface S5 (e.g., substantially vertical upward slanting surface S5 in one embodiment) until it encounters the transition point T4. After reaching the transition point T4, the pin would travel upward through the channel C2 to encounter the upwardly slanting surface S6 of the first portion 125. The upwardly slanting surface S6, in the embodiment shown, slants in an opposite direction as the upwardly slanting surface S1A, and in the same direction as the upwardly slanting surface S2. In the embodiment shown, the upwardly slanting surface S2 and upwardly slanting surface S6 are substantially, if not completely, parallel with one another. When the pin encounters the upwardly slanting surface S6, it causes the male latch member 120 to rotate clockwise (when viewed from above) and thus the pin would slide upwards until it reaches the vertical upper limit L3.

At this point, the pin is locked in the vertical upper limit L3 position until the relative downward force subsides. Exchanging the downward force for an upward force, the pin would travel down the surface S7 (e.g., substantially vertical surface S7 in one embodiment) to the transition point T5. At the transition point T5, the pin would head through the channel C3 toward the downwardly slanting surface S8 of the second portion 126. As the pin encounters the downwardly slanting surface S8, it would cause the male latch member 120 to rotate clockwise (when viewed from above) and thus the pin would slide downward past the transition point T6 until it reaches the transition point T7. When the pin reaches the transition point T7, the female hook member 110, as well as anything attached to it, would disengage from the male latch member 120. This would be considered the "place" of the "pick and place" process.

In contrast, to that described above, the pin might first encounter the upwardly slanting surface S1b of the second portion 126, which would cause it to take an entirely different path. For example, if the pin were to encounter the upwardly slanting surface S1b, it would cause the male latch member 120 to rotate clockwise (when viewed from above) and thus the pin would slide upwards until it reaches the transition point T7. After reaching the transition point T6, the pin would travel upward through the channel C4 to encounter the upwardly slanting surface S2' of the first portion 125. The upwardly slanting surface S2', in the embodiment shown, slants in the same direction as the upwardly slanting surface S1b. When the pin encounters the upwardly slanting surface S2', it causes the male latch member 120 to rotate clockwise (when viewed from above) and thus the pin would slide upwards until it reaches the vertical upper limit L1'. Thus far, the pin has traveled to the vertical upper limit L1' by way of a relative downward force (e.g., an intentional force, gravitational force, etc.) upon the male latch member 120.

At this point, the pin is locked in the vertical upper limit L1' position until the relative downward force subsides. Exchanging the downward force for an upward force, the pin would travel down the surface S3' (e.g., substantially vertical surface S3 in one embodiment) to the transition point T3'. At the transition point T3', the pin would head toward the downwardly slanting surface S4' of the third portion 127. As the pin encounters the downwardly slanting surface S4', it would cause the male latch member 120 to rotate clockwise (when viewed from above) and thus the pin would slide downward until it reaches the vertical lower limit L2'. At this point, the female hook member 110, as well as anything attached to it, could be picked up by way of the pin being held in the vertical lower limit L2'. This would again be considered the "pick" of the "pick and place" process.

The pin may be released from the vertical lower limit L2' of the male latch member 120 by putting relative downward force (e.g., an intentional force, gravitational force, etc.) upon the male latch member 120. As downward force is applied to the male latch member 120, the pin travels up the upward slanting surface S5' (e.g., substantially vertical upward slanting surface S5 in one embodiment) until it encounters the transition point T4'. After reaching the transition point T4', the pin would travel upward through the channel C2' to encounter the upwardly slanting surface S6' of the first portion 125. The upwardly slanting surface S6', in the embodiment shown, slants in the same direction as the upwardly slanting surface S1b and upwardly slanting surface S2'. When the pin encounters the upwardly slanting surface S6', it causes the male latch member 120 to rotate clockwise (when viewed from above) and thus the pin would slide upwards until it reaches the vertical upper limit L3'.

At this point, the pin is locked in the vertical upper limit L3' position until the relative downward force subsides. Exchanging the downward force for an upward force, the pin would travel down the surface S7' (e.g., substantially vertical surface S7 in one embodiment) to the transition point T5'. At the transition point T5', the pin would head through the channel C3' toward the downwardly slanting surface S8' of the second portion 126. As the pin encounters the downwardly slanting surface S8', it would cause the male latch member 120 to rotate clockwise (when viewed from above) and thus the pin would slide downward past the transition point T6' until it reaches the transition point T7'. When the pin reaches the transition point T7', the female hook member 110, as well as anything attached to it, would disengage from the male latch member 120. This would again be considered the "place" of the "pick and place" process.

As noted in FIGS. 2N and 2P, in one embodiment of the disclosure, if a line along S1a' is extended (e.g., as shown by the dotted line DL1) it intersects the upwardly slanting surface S2', as opposed to the channel C3 of the other pin path. Said another way, in the embodiment shown, the dotted line DL1 intersects the upwardly slanting surface S2' above the transition point T6. This dotted line DL1 indicates the likely path of travel for a given pin. This is designed to assure that a given pin, when travelling along the dotted line DL1, will not engage the wrong channel (e.g., in this instance channel C3). Similarly, if a line along S1$b$ is extended (e.g., as shown by the dotted line DL2) it, in one embodiment, would intersect the upwardly slanting surface S1$a$', as opposed to a substantially vertical surface. This is designed to assure that a given pin will not bounce back off of the surface S1$a$' into the channel C3, as opposed to ultimately the desired channel C1'.

As further noted in FIGS. 2N and 2P, in one embodiment of the disclosure, the vertical upper limit L3 is vertically higher (e.g., by a distance (D1)) than the vertical upper limit L1, and the vertical upper limit L3' is vertically higher (e.g., by a distance (D1')) than the vertical upper limit L1'. In this embodiment, distance D1 and D1' are substantially identical. Similarly, in the embodiment shown, the vertical upper limit L1 is horizontally spaced from the vertical upper limit L3 by a distance D2, and the vertical upper limit L1' is horizontally spaced from the vertical upper limit L3' by a distance D2'. In this embodiment, distance D2 and D2' are substantially identical. Unique to at least one embodiment of the present design, a horizontal distance D3 separating the vertical upper limit L3 and the vertical upper limit L1' is different from the distances D2 or D2'. In one embodiment, the distance D3 is greater than each of the distances D2 or D2'. Such a spacing is designed to allow the dotted line DL1 to intersect the upwardly slanting surface S2', as opposed to the channel C3 of the other pin path, and therefore reduce the likelihood of a given pin engaging the wrong channel.

One who is of skill in the art will recognize that the pins may also be located on a male member while the first, second and third portions may be located on a female member. Such a configuration will now be discussed.

Figure 3A:
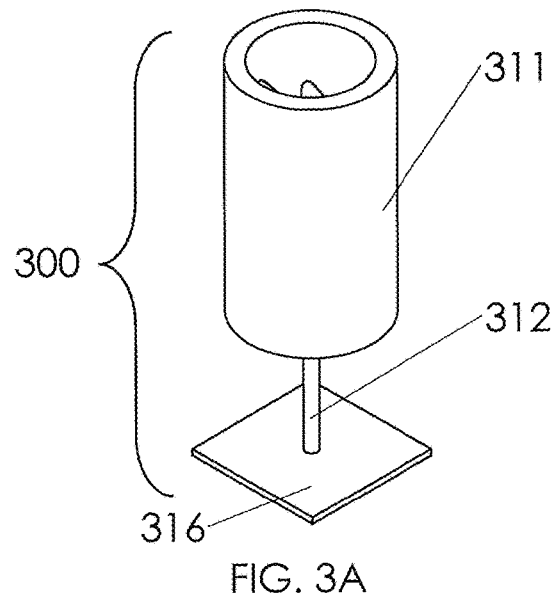
FIG. 3A is a perspective view of one embodiment of a pick-and-place system constructed according to the principles of the present disclosure.
Figure 3B:
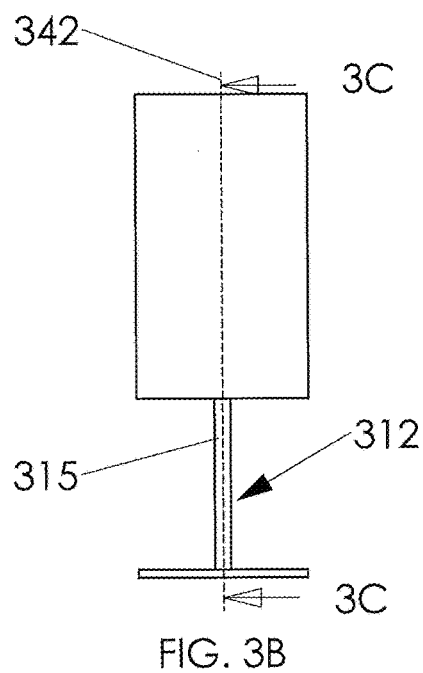
FIG. 3B is an elevation view of the pick-and-place device of FIG. 3A.

Referring now to FIG. 3A illustrated is a perspective view of one embodiment of a pick-and-place system 300 constructed according to the principles of the present disclosure. The pick-and-place system 300 of FIG. 3A comprises a first latch member and a second latch member. In this embodiment, the first latch member is a female latch member 311 having a central axis 313. The second latch member is a male hook member 312 having a core 315 coincident with the central axis 313 and a base 316. FIG. 3B is an elevation view of the pick-and-place device 300 of FIG. 3A.

Figure 3C:
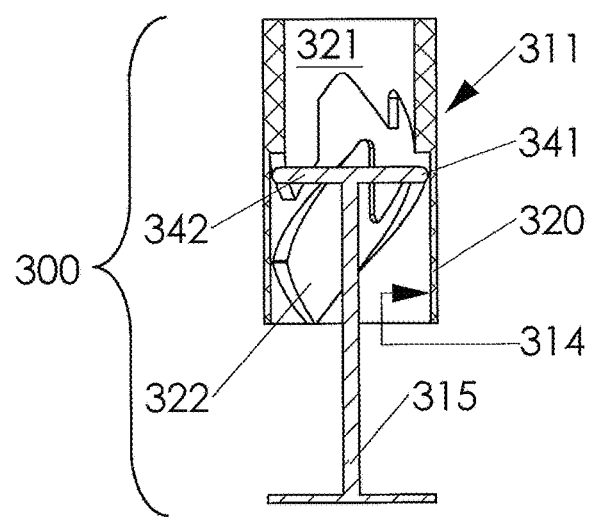
FIG. 3C is a sectional view of the pick-and-place system of FIG. 3A along plane 3C-3C.

Referring now to FIG. 3C with continuing reference to FIG. 1, illustrated is a sectional view of the pick-and-place system 300 along plane 3C-3C. The female latch member 311 comprises a hollow cylinder 320 having an internal surface 314 parallel to the central axis 313 and upon which first, second and third portions 321-323 (third portion 323 not visible), respectively, are formed. The first, second and third portions 321-323, respectively, are analogous to the first, second and third portions 125-127, respectively of FIG. 1. The male hook member 312 further comprises first and second pins 341, 342, respectively, coupled to an end of the core 315 and extending radially therefrom. While the core 315 is shown as relatively thin, an alternative embodiment is envisioned to have a core that substantially fills the lower cavity of the female latch member 311 with the first and second pins 341, 342, respectively, extending radially therefrom. One who is of skill in the art will realize that the base 316 does not need to be a rectangular plate as shown, but can be any configuration that will readily couple to a workpiece.

In the present embodiment, the female latch member 311 reciprocates vertically to temporarily latch with the male hook member 312. Of course, the relative positions of the female and male members 311, 312 can be swapped so that the female latch member 311 is coupled to the workpiece and the male latch member 312 performs the latching/unlatching function. The operation of the pick-and-place system 300 is essentially the same as the rotating tension latch 100 of FIG. 1.

One or both male or female members (e.g., whether latch or hook) could contain sensors 160 to assist a control system or user in recognizing the pin or pins' relative position within the channel. For example, in FIG. 2E, when the pin 112 reaches the secure position 204, it could signal the user or automated control system by completing a circuit, touching a contact switch, or otherwise. One skilled in the art will recognize that such a sensor 160 can be placed to sense the position of the pin at any point in the channel.

It should also be noted that one or both of the members (e.g., whether latch or hook) could contain sensors to assist a control system or user in aligning the two parts concentrically before latching. For example, in FIG. 1, an optical sensor could be placed at the tip of the cone 128 to sense a mark or light emitter in the center of the female member. Similarly, in the embodiment shown in FIG. 3A, the sensor could be placed within the female latching member 311 or it's actuator (not shown), and the target mark or light emitter could be placed on the pins 341, 342 of the male hook member 312. Strategically placed magnets 170 could be used to sense or even assist alignment of the two members.

Thus, a rotating tension latch and a pick-and-place system have been described wherein vertical motion of the one latch member relative to the complementary hook member latches and unlatches the two members. Clockwise or counterclockwise rotation of one member is automatically accomplished as the first member engages or disengages from the second member. One of skill in the pertinent art will readily understand that the roles of the male and female members as described may be reversed, i.e., the male member may be affixed to a workpiece or other apparatus, and the female member may be used to engage and disengage the male member.

Tension in the present disclosure is defined as the resistance of one member, e.g., female hook member 110, to motion when a vertical upward force is applied to the complementary member, e.g., male latch member 120. The use of such terms as providing, forming, etc., as used herein includes: manufacturing, milling, casting, contracting, purchasing, etc. Those skilled in the art to which this application relates will appreciate that other and further additions, deletions, substitutions and modifications may be made to the described embodiments.

Figure 4A:
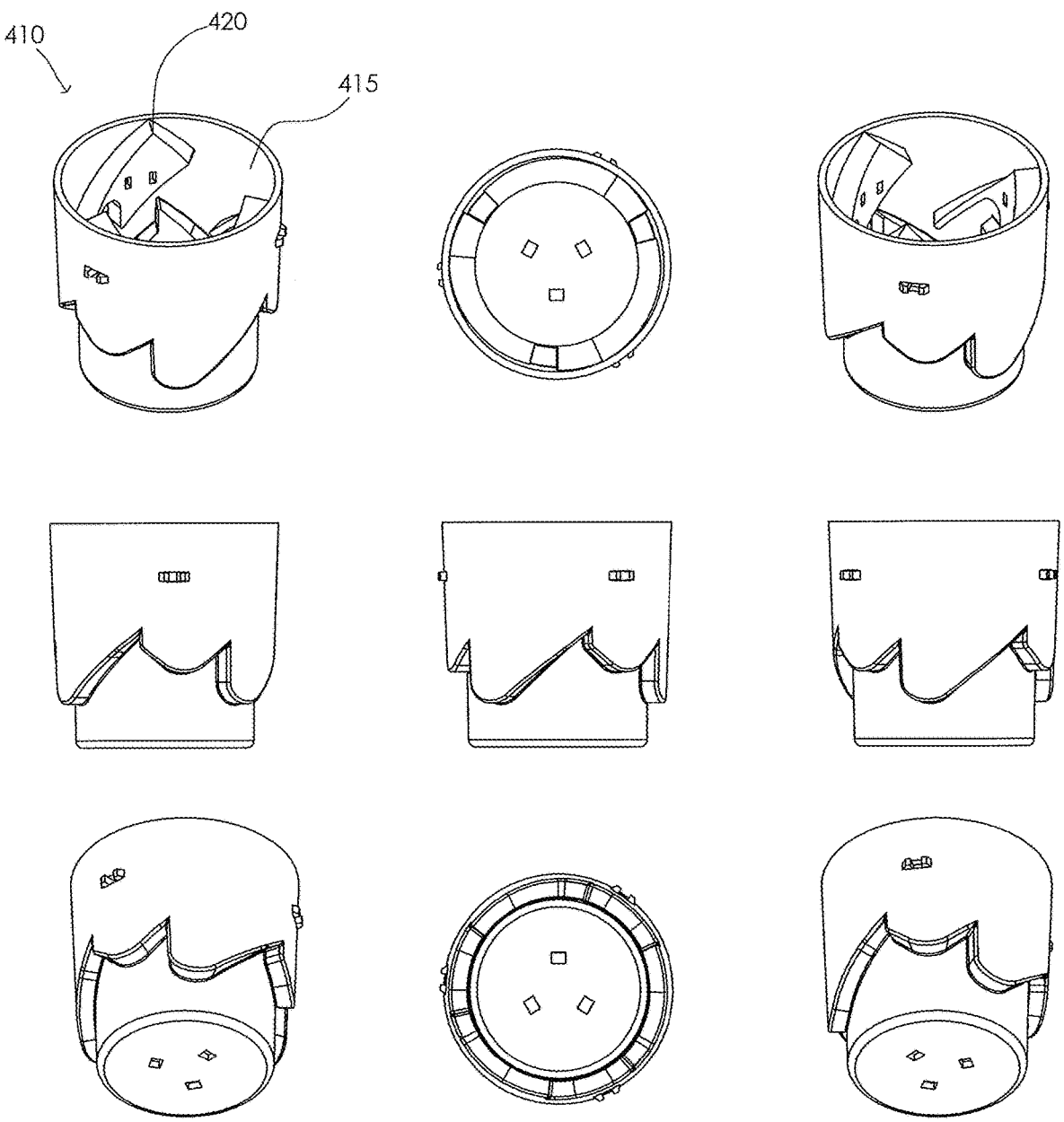
FIGS. 4A-4G illustrate various views of a rotating tension latch using a female latch member and male hook member.

Referring to FIGS. 4A through 4G, illustrated are various different views of the various different features of another embodiment of a rotating tension latch 400 in accordance with the present disclosure. FIG. 4A illustrates a plurality of different views of a female latch member 410 in accordance with the present disclosure. The female latch member 410, in this embodiment, includes a main body 415, as well as inserts 420. The main body 415 and inserts 420 collectively form a path of travel for one or more pins of an associated male hook member 450. Accordingly, the main body 415 and inserts 420 establish the one or more first upper limits, one or more lower limits, and the one or more second upper limits. As discussed in greater detail above, the lower limit is the stopping point for the pin when the female latch member 410 is experiencing a force away from the male hook member 450. In accordance with the disclosure, this is the position where a payload (e.g., object) will be lifted. Similarly, the upper limits are stopping point for the pin when the female latch member 410 is experiencing a force towards the male hook member 450. In the given embodiment of FIG. 4A, the device includes only two (e.g., first and second) upper limits. Accordingly, the pin would first encounter the first upper limit, then the lower limit, and finally the second upper limit.

The first upper limit is configured to align the contours created by the main body 415 and inserts 420 in such a way that a force away from the male hook member 450 will cause the pin to land in the lower limit. Likewise, lower limit is configured to align the contours created by the main body 415 and inserts 420 in such a way that a force toward the male hook member 450 will cause the pin to land in the second upper limit. Similarly, the second upper limit is configured to align the contours created by the main body 415 and inserts 420 in such a way that a force away from the male hook member 450 will cause the pin to release from the structure, and thereby complete the latch sequence.

Figure 4B:
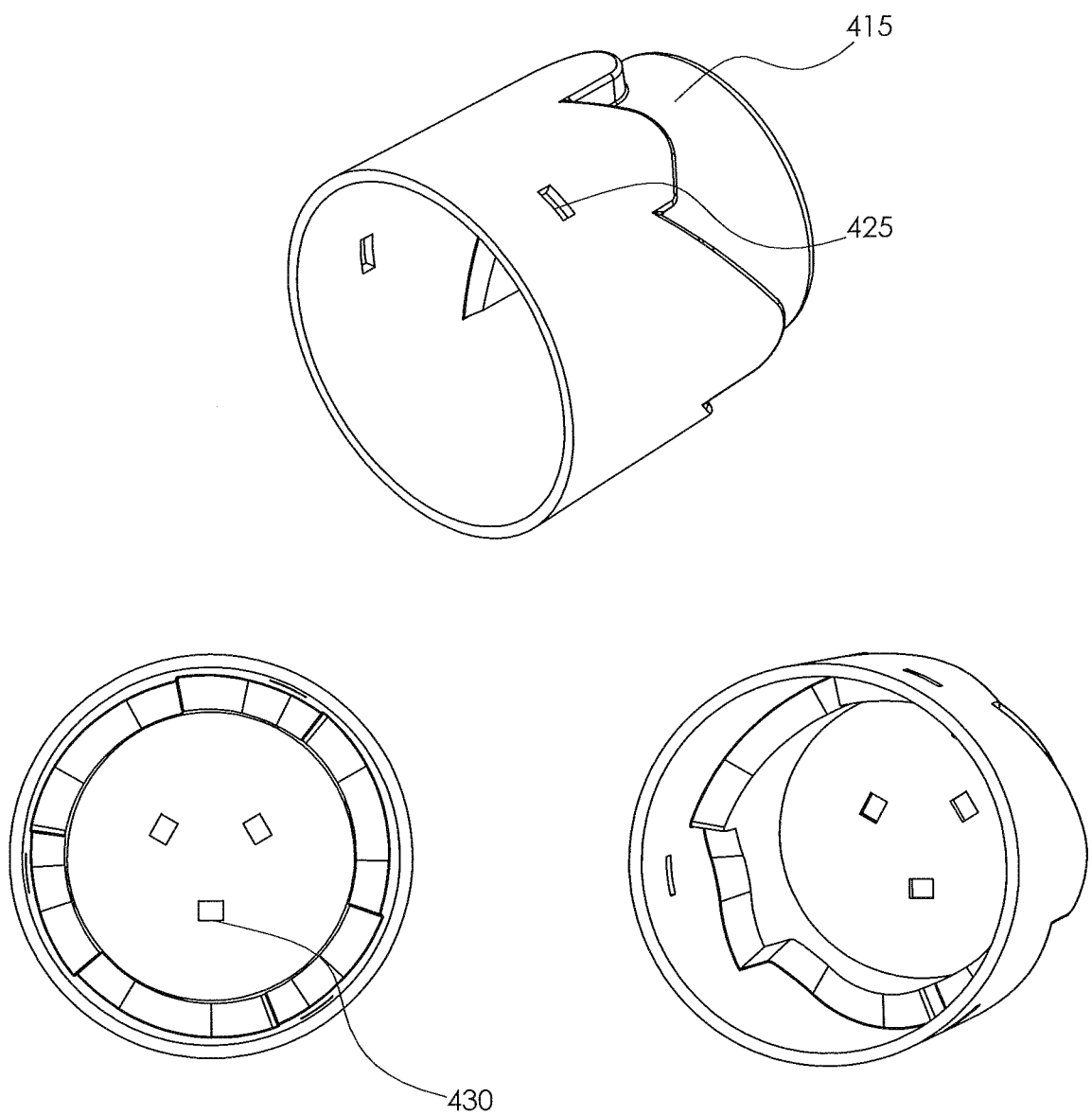

Turning briefly to FIG. 4B, illustrated are various different views of the main body 415. As can be seen, the main body 415 includes a plurality of side slots 425 therein. The side slots 425, in the embodiment of FIG. 4B, are configured to engage with associated features on the inserts 420 to complete the female latch member 410. For example, the side slots 425 are appropriately sized and positioned to mate with one or more clips in the associated inserts 410. (See FIG. 4C). The main body 415 of FIG. 4B additionally includes a plurality of top slots 430. The top slots 430, in this embodiment, are configured to engage with associated features on the floating bearing assembly 470. (See FIG. 4E).

The main body 415, in the embodiment of FIG. 4B, is specifically designed to be readily and easily manufactured using injection molding. When injection molded, the side slots 425 and top slots 430 are created using side actions. Otherwise, the main body 415 requires just a straight-pull mold.

Figure 4C:
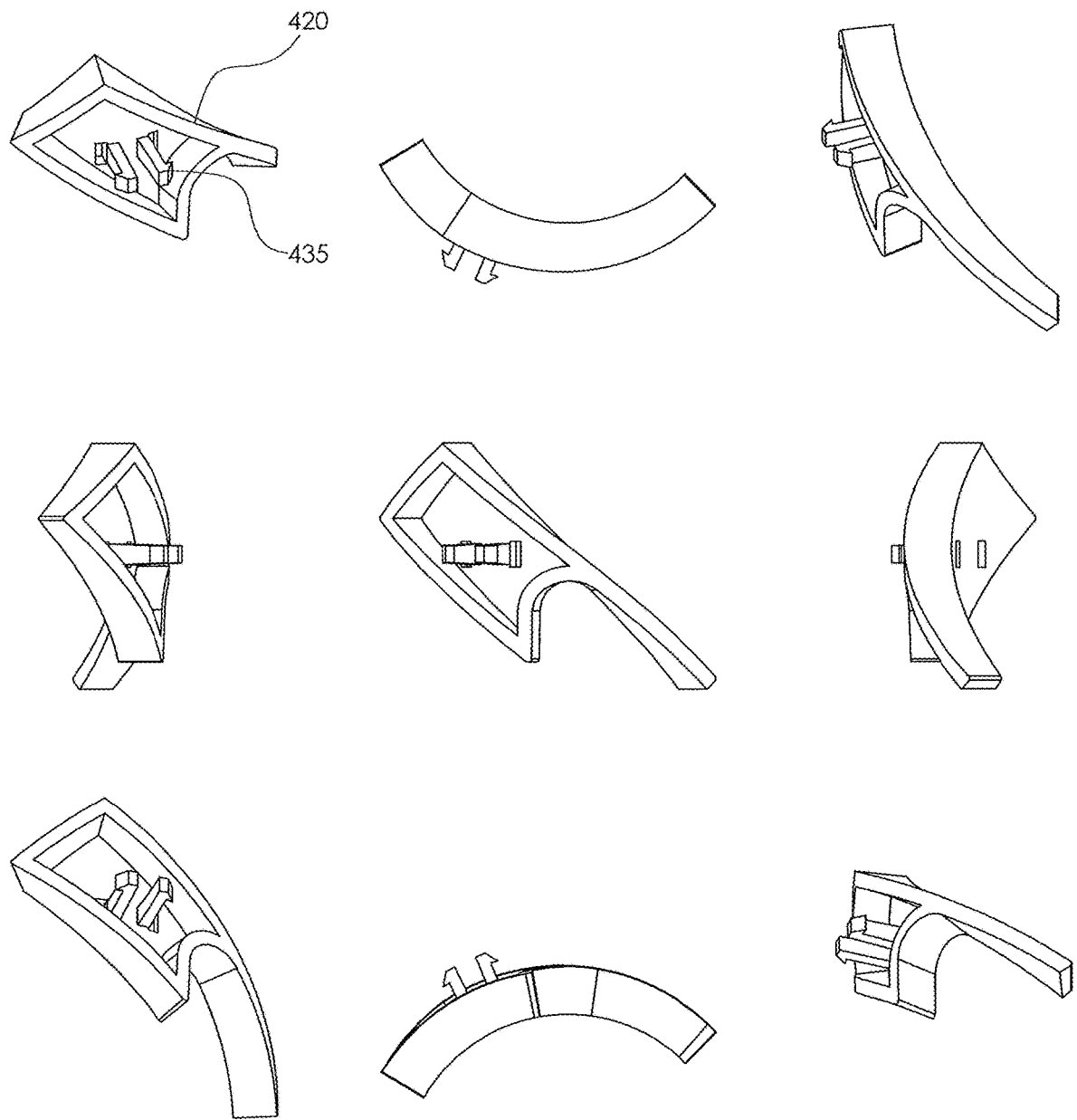

Turning briefly to FIG. 4C, illustrated are various different views of inserts 420. As can be seen, the inserts 420 of FIG. 4C include clips 435. The clips 435, in this embodiment, are configured to engage associated side slots 425 in the main body 415, resulting in the female latch member 410 of FIG. 4A. The inserts 420, similar to the main body 415, are specifically designed to be readily and easily manufactured using injection molding. When injection molded, the inserts 420 may be created using a straight-pull mold.

Figure 4D:
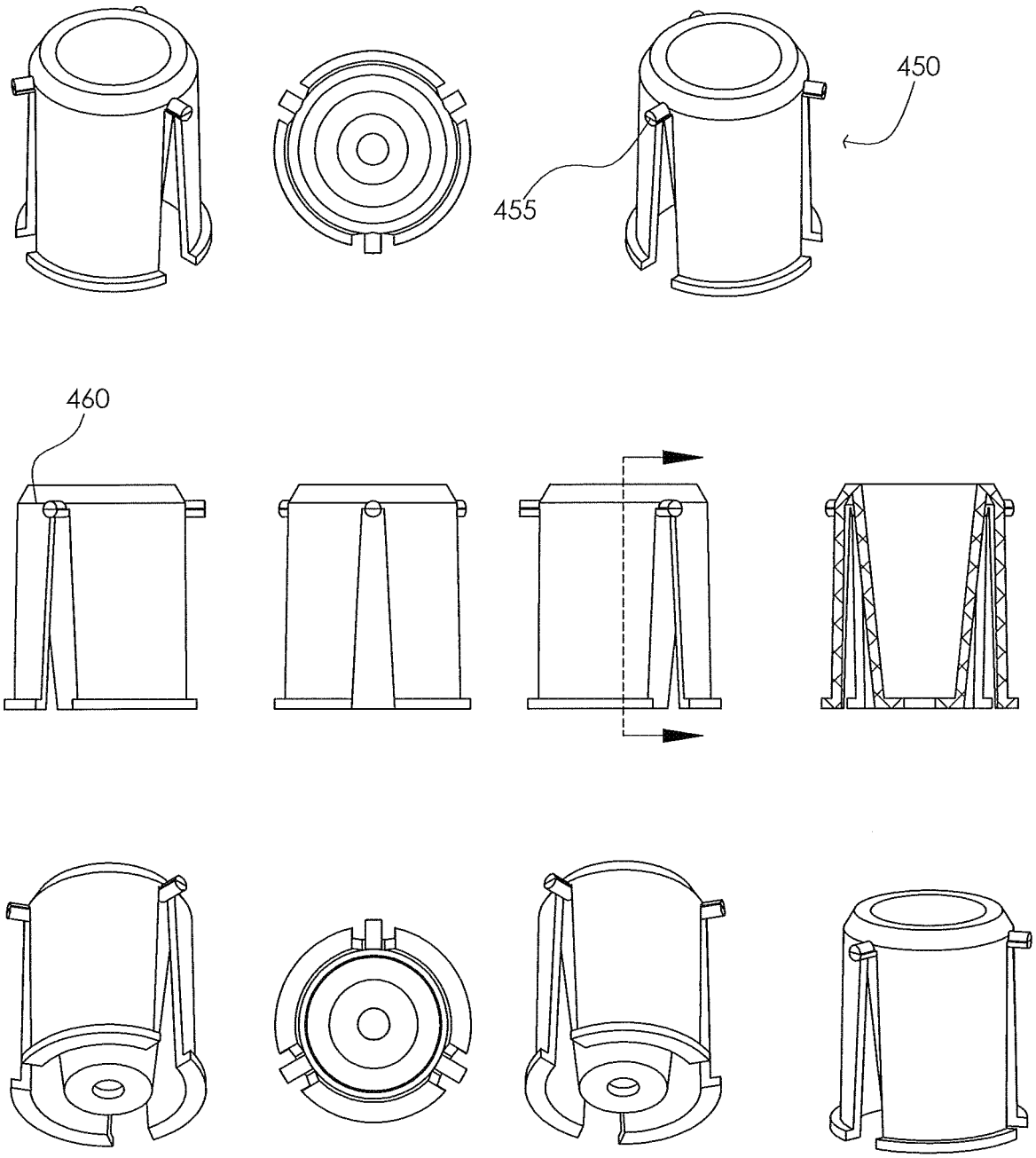

Turning now to FIG. 4D, illustrated are a plurality of different views for the male hook member 450. The male hook member 450, in the embodiment shown, includes a plurality of pins 455 proximate an upper surface thereof. As understood from the discussions above, the one or more pins are configured to follow the cam paths created by the main body 415 and inserts 420. The male hook member 450, in the embodiment shown, generally takes the shape of a cylinder. While not necessary for the rotating tension latch 400 to operate, the cylindrical shape helps maintain angular alignment during latching. In the illustrated embodiment, the top of the male hook member has an angled surface 460. In this embodiment, the angled surface 460 helps adjust for misalignment between the male hook member 450 and the associated female latch member 410. The male hook member 450 additionally includes a mounting feature (e.g., a hole 465) in a bottom surface thereof. The hole 465, in this application, could be used to attach the male hook member 450 to a payload (e.g., object) to be lifted.

The male hook member 450, similar to the female latch member 410, is specifically designed to be readily and easily manufactured using injection molding. When injection molded, the male hook member 450 may be created using a single (e.g., straight) pull mold. Notwithstanding, the male hook member 450 could additionally be machined on a standard CNC mill, among a number of different manufacturing processes.

The term pins has been used throughout the disclosure. Those skilled in the art understand that the term pins is a generic name, which could encompass many different features capable of following the contours to complete the latch sequence. For example, cam rollers could be used, among other features, in lieu of static posts (e.g., as shown above). Similarly, the features need not be round, but could be flat as well as shown by feature 755 in FIG. 7D. Flat pins would, advantageously, have improved rigidity and manufacturability.

Figure 4E:
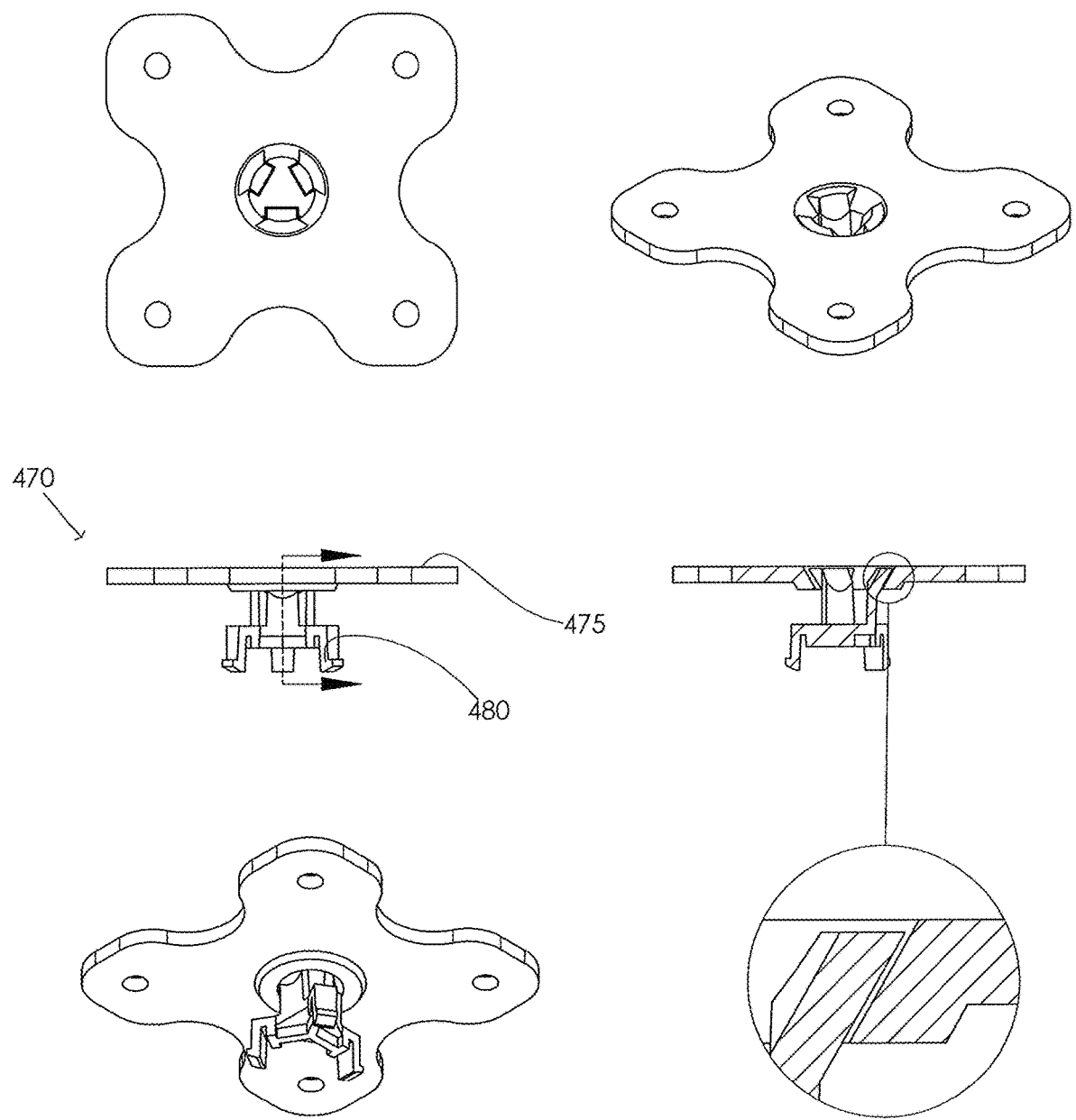

Turning to FIG. 4E, illustrated is a floating bearing assembly 470 in accordance with the disclosure. In certain situations, the latch member is not perfectly aligned with the hook member. A floating bearing, such as the floating bearing assembly 470, which allows for rotation along with parallel, angular, and axial flexibility, would allow the latch member to mate with the hook member even if it is slightly misaligned. A conical shape could allow the bearing to naturally fall to the center but still be able to move slightly in any direction. This floating bearing could also help prevent unwanted spinning of the rotating tension latch. For example, when the floating bearing is rested down (e.g., when a payload is hanging from the latch), it could create sufficient friction to prevent most spinning. In an alternative embodiment, the floating bearing could also be toothed so that when it is rested down it cannot spin. In both embodiments, when the pins reach an upper surface, they will allow rotation of the latch. However, when the pins are contacting a lower surface, the bearing with resist rotation. Since the latch requires relative rotation between itself and the hook to progress through the cam, the hook (and thus the payload) should be able to rotate when the latch cannot. Since when the pins are contacting a lower surface of the latch the latch is putting a substantially upwards (counter-gravity) force on the hook, it will reduce whatever friction force there is between the payload and the landing surface. Thus, while the bearing will prevent rotation of the latch, the payload and hook will be able to rotate to allow complete operation of the rotating latch system.

In yet another embodiment, a spring or other similar feature could be used so that the rough or toothed surfaces only contact when the weight of a payload is present and not when the rotating tension latch is not engaged. When the payload weight is removed and the pin moves upwards through the mechanism to engage an upper limit, or upper surface, it will be able to spin freely because the rough or toothed surfaces will not be touching/mated. It should be noted that as the hook is being released from the latch, it may put slight pressure on the toothed or rough surface. A spring could be used so that a certain amount of force (a fraction of the weight of a package) is required so that the toothed or rough surfaces make contact.

A floating bearing could also allow for a predetermined amount of tilt. This tilt could help move the center of mass of the payload, such that the center of mass could be closer to being directly underneath the bearing. This would allow the hook to be offset from the center of the payload intentionally (to allow for package contents to fit better) or by accident (due to uneven packaging).

The floating bearing 470 illustrated in FIG. 4E includes a female floating bearing portion 475 and a male floating bearing portion 480. In the illustrated embodiment, as shown in the cut away view, associated angles of the rim of the female floating bearing portion 475 and the shoulder of the male floating bearing portion 480 cause the male floating bearing portion 480 to the center of the female floating bearing portion 475 when under gravity.

Figure 4F:
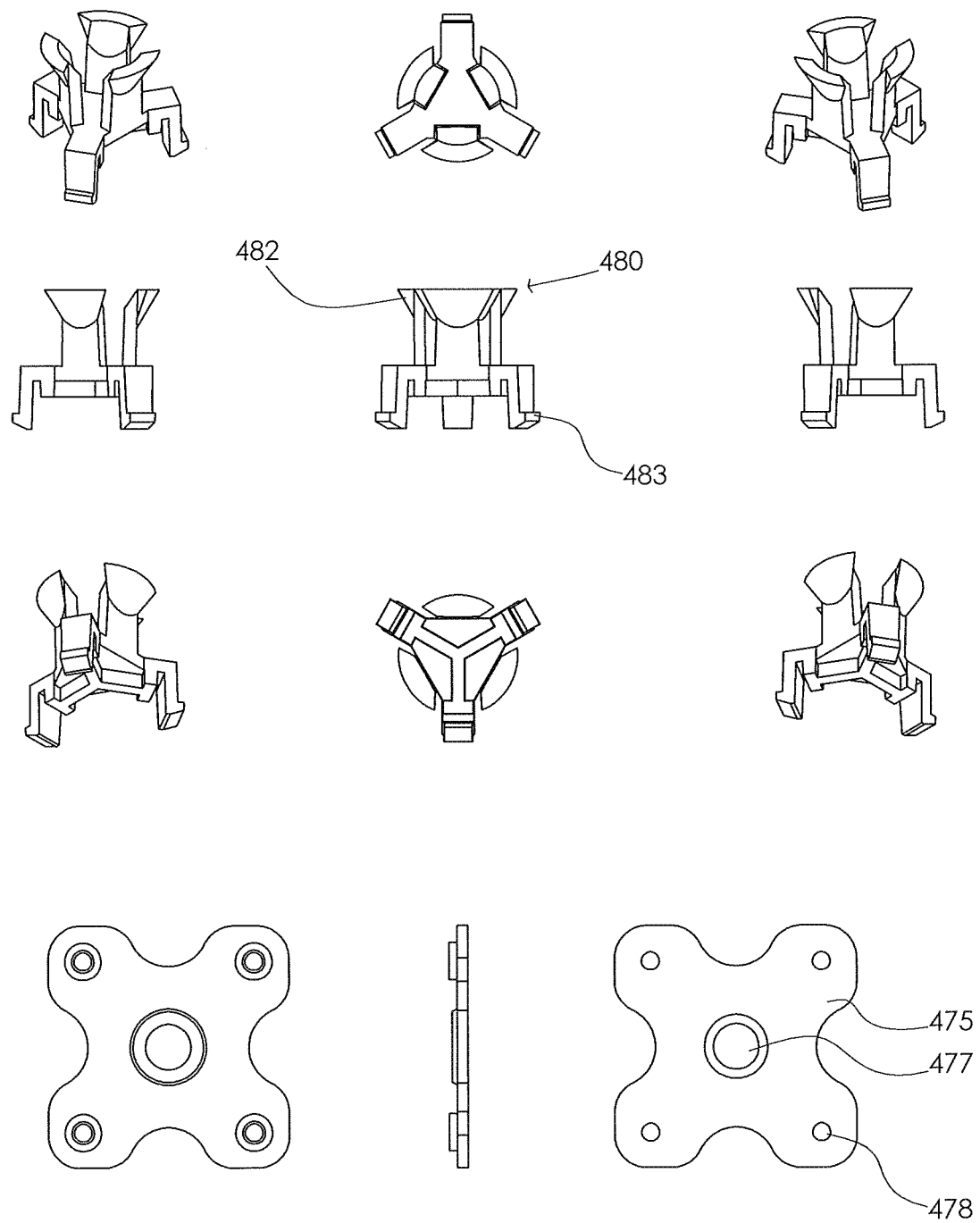

Turning briefly to FIG. 4F, illustrated are various separate views of the female floating bearing portion 475 and the male floating bearing portion 480. As can be readily seen, the female floating bearing portion 475 of the embodiment of FIG. 4F includes a central opening 477 for accepting the male floating bearing portion 480, as well as one or more mounting holes 478. The one or more mounting holes 478 may couple to an operation mechanism, such as a person, a crane, a robot, a drone, etc.

As can also be readily seen, the male floating bearing portion 480 may include the aforementioned shoulder 482 for engaging the central opening 477 in the female floating bearing portion 475. In the given embodiment of FIG. 4F, the shoulder 482 consists of two or more flexible conical snaps that loosely fit into the central opening 477 in the female floating bearing portion 475 The male floating bearing portion 480 may additionally include one or more clips 483. The one or more clips 483 may engage, in one embodiment, the one or more top slots 430 in the female latch member 410, thereby releasably coupling the floating bearing 470 to the female latch member 410.

The female floating bearing portion 475 and male floating bearing portion 480, similar to many of the other features of the rotating tension latch 400, are specifically designed to be readily and easily manufactured using injection molding. When injection molded, the female floating bearing portion 475 and male floating bearing portion 480 may each be created using a straight-pull mold. Notwithstanding, the female floating bearing portion 475 and male floating bearing portion 480 could additionally be machined on a standard CNC mill, among a number of different manufacturing processes.

Figure 4G:
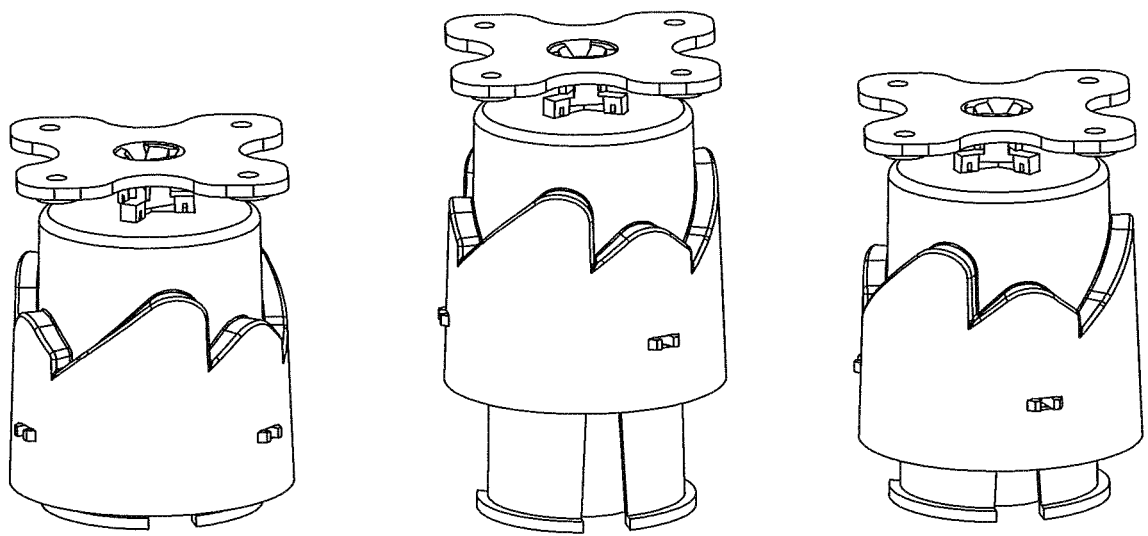

Turning now to FIG. 4G, illustrated is the rotating tension latch 400, including the female latch member 410 and male hook member 450 at various different positions of engagement. For example, the left most depiction illustrates the rotating tension latch 400 at a point when the one or more pins 455 are located at the first upper limit of the female latch member 410. The middle depiction illustrates the rotating tension latch 400 at a point when the one or more pins 455 are located at the lower limit of the female latch member 410. The right most depiction illustrates the rotating tension latch 400 at a point when the one or more pins 455 are located at the second upper limit of the female latch member 410.

Figure 5:
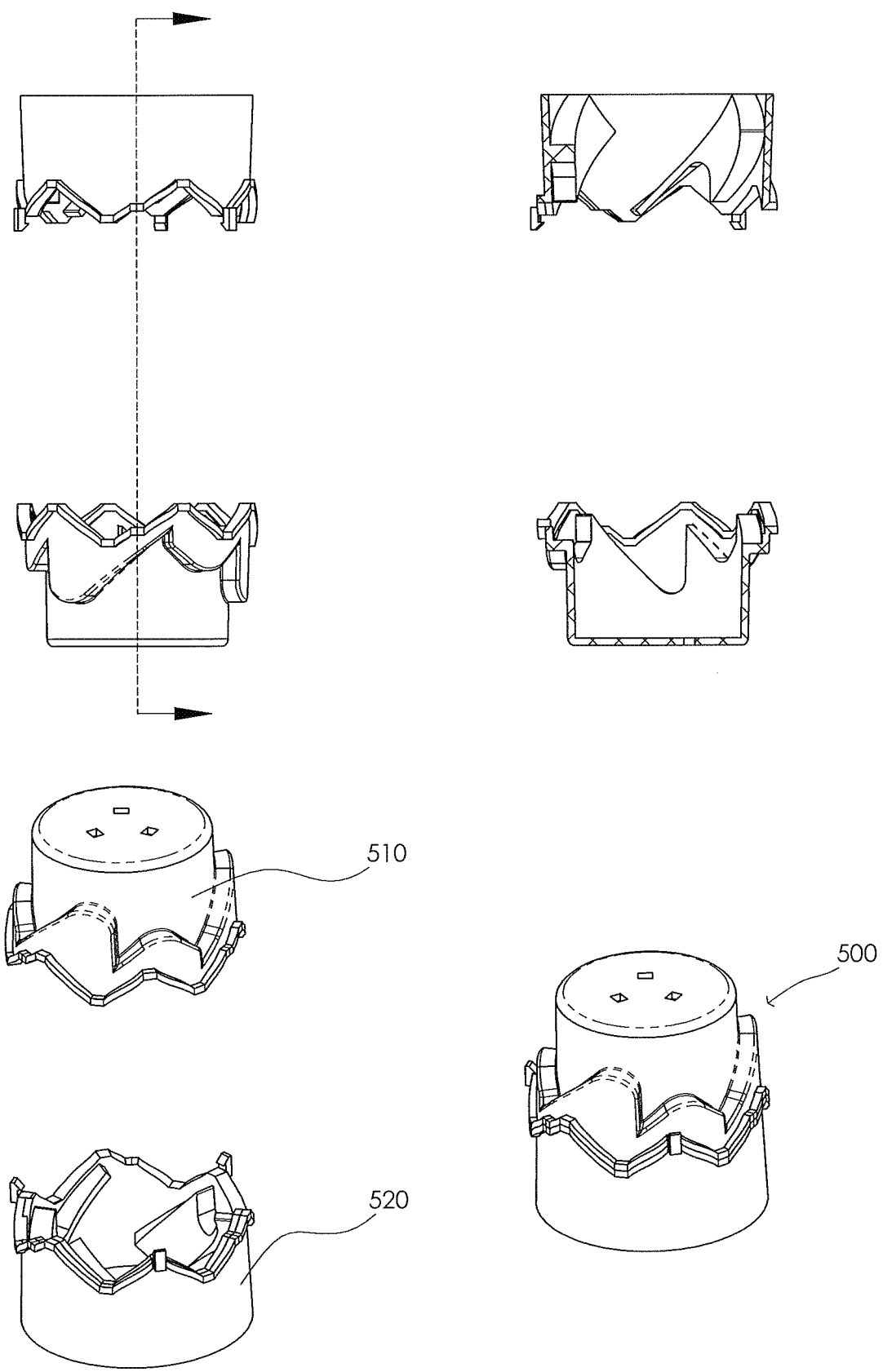
FIG. 5 illustrates various different views of an alternative female latch member.

Turning briefly to FIG. 5, illustrated is an alternative embodiment of a female latch member 500. The female latch member 500, in comparison to the female latch member 410 illustrated above, is a two-piece design. For instance, rather than creating each insert 420 separately, one could form all of them in a ring as shown in FIG. 5. This limits the assembly of the female latch member 500 to just an upper main body 510 and a lower main body 520. In this embodiment, the upper main body 510 and lower main body 520 could be screwed, bolted, fused, snapped, or otherwise joined together. This embodiment allows each piece to be molding in a straight-pull mold.

Figure 6:
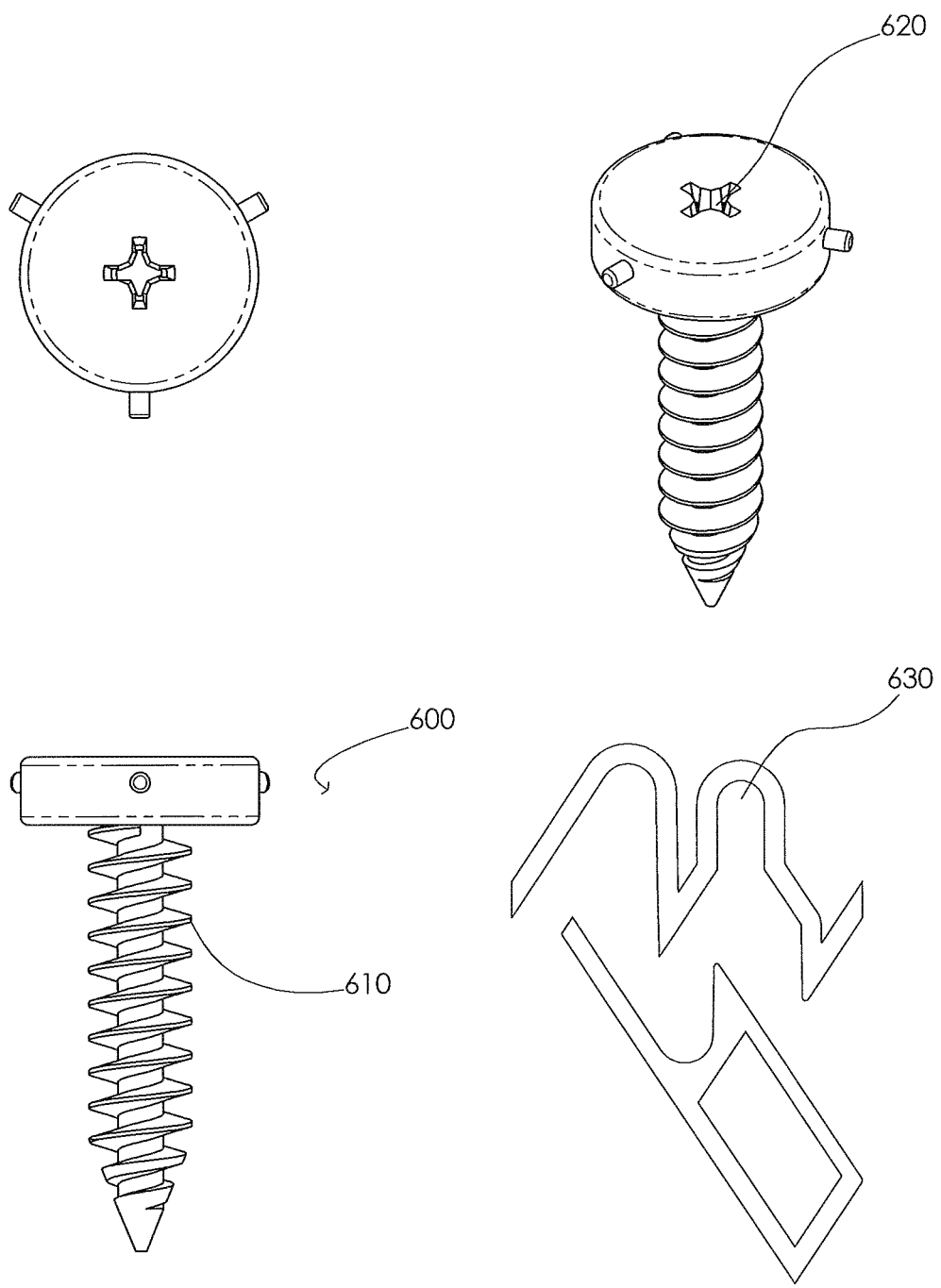
FIG. 6 illustrates various different views of a screw-type male hook member.

Turning now to FIG. 6, illustrated is an alternative embodiment for a male hook member 600. In the embodiment of FIG. 6, the male hook member 600 is integrated into a screw. It is envisioned that the screw-type male hook member 600, including threads 610, can be directly mounted to a payload so that the rotating tension latch can move the payload. This screw-type male hook member 600 can be picked up, moved, and screwed in with a latch. The female latch member could use a spring (e.g., not shown) to maintain downwards force on the screw-type male hook member 600 so that it does not rely on gravity.

A screw-type male hook member 600, such as that shown in FIG. 6, could be used in surgery so that surgical screws are not dropped. The screw-type male hook member 600 can also be used with automated assembly or robots, because the screw-type male hook member 600 can easily be attached and aligned to the driver. Moreover, in this application the screw-type male hook member 600 could be plastic since they would not need to be magnetic. In another application, the female latch member could be used to begin screwing the screw-type male hook member 600 in place. Thereafter, a feature 620 on the top of the screw-type male hook member 600, such as phillips head or torx head indentation, among others, could be used with a different style driver to finish screwing the screw-type male hook member 600 into place. In yet another embodiment, a latch, spring, driver combination could be used so that as the screw-type male hook member 600 is screwed in and the bottom lip of the female latch member reaches the working surface, it starts to retract a spring and engages the standard driving feature (e.g., like the phillips head or torx head indentation). It may be beneficial to have a vertical extension 630 at the second upper limit to help drive the screw.

Figure 7A:
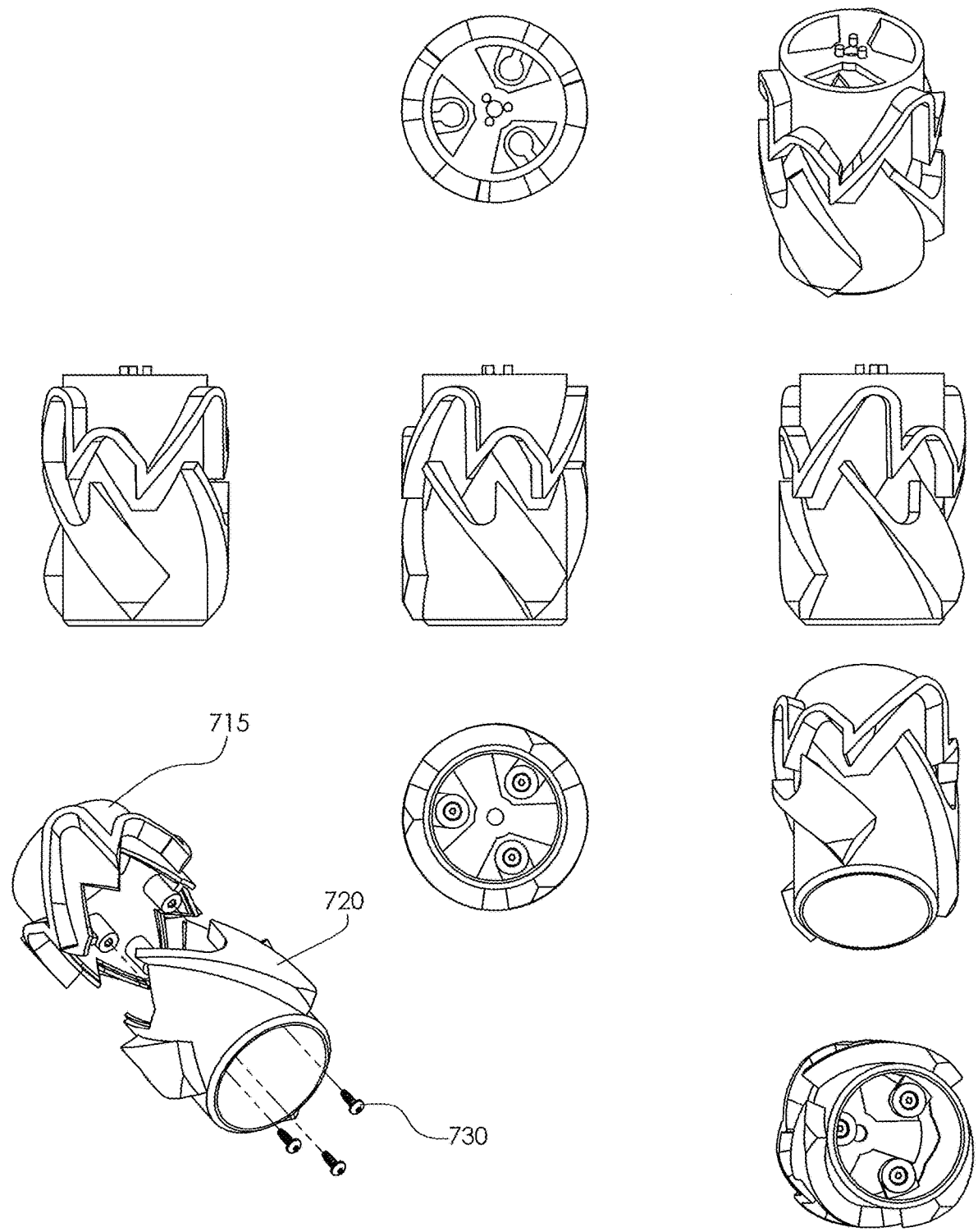
FIG. 7A-7H illustrate various views of a rotating tension latch using a male latch member and female hook member.

Referring to FIGS. 7A through 7G, illustrated are various different views of the various different features of another embodiment of a rotating tension latch 700 in accordance with the present disclosure. FIG. 7A illustrates a plurality of different views of a male latch member 710 in accordance with the present disclosure. The male latch member 710, in this embodiment, includes a first main body portion 715 and a second main body portion 720. The first and second main body portions 715, 720 collectively form a path of travel for one or more pins of an associated female hook member 750. Accordingly, the first and second main body portions 715, 720 establish the one or more first upper limits, one or more lower limits, and the one or more second upper limits. As discussed in greater detail above, the lower limit is the stopping point for the pin when the male latch member 710 is experiencing a force away from the female hook member 750. In accordance with the disclosure, this is the position where a payload (e.g., object) will be lifted. Similarly, the upper limits are stopping point for the pin when the male latch member 710 is experiencing a force towards the female hook member 750. In the given embodiment of FIG. 7A, the device includes only two (e.g., first and second) upper limits. Accordingly, the pin would first encounter the first upper limit, then the lower limit, and finally the second upper limit.

The first and second main body portions 715, 720 may be attached to one another using bolts or screws 730. Alternatively, the first and second main body portions 715, 720 may snap together, be glued together, be fused together, or otherwise joined. The present disclosure should not be limited to any specific connection method, unless otherwise stated.

Figure 7B:
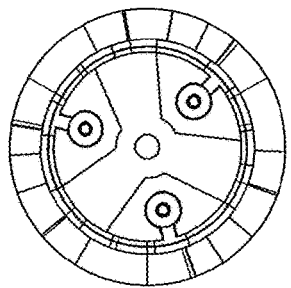
Figure 7B:
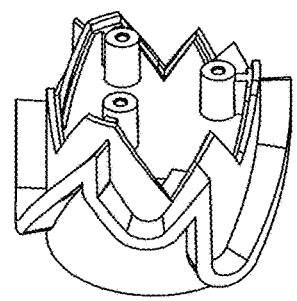
Figure 7B:
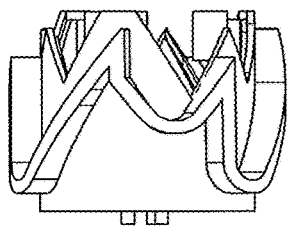
Figure 7B:
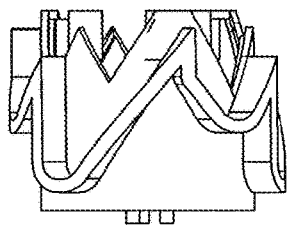
Figure 7B:
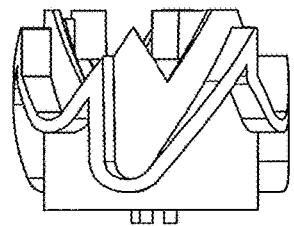
Figure 7B:
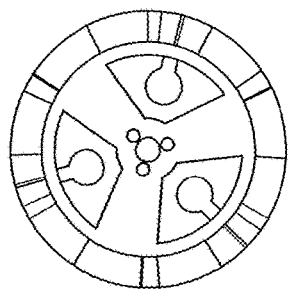
Figure 7B:
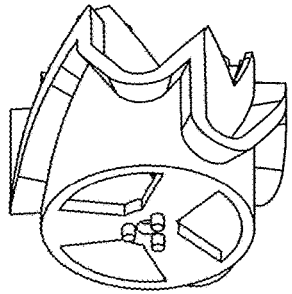
Figure 7C:
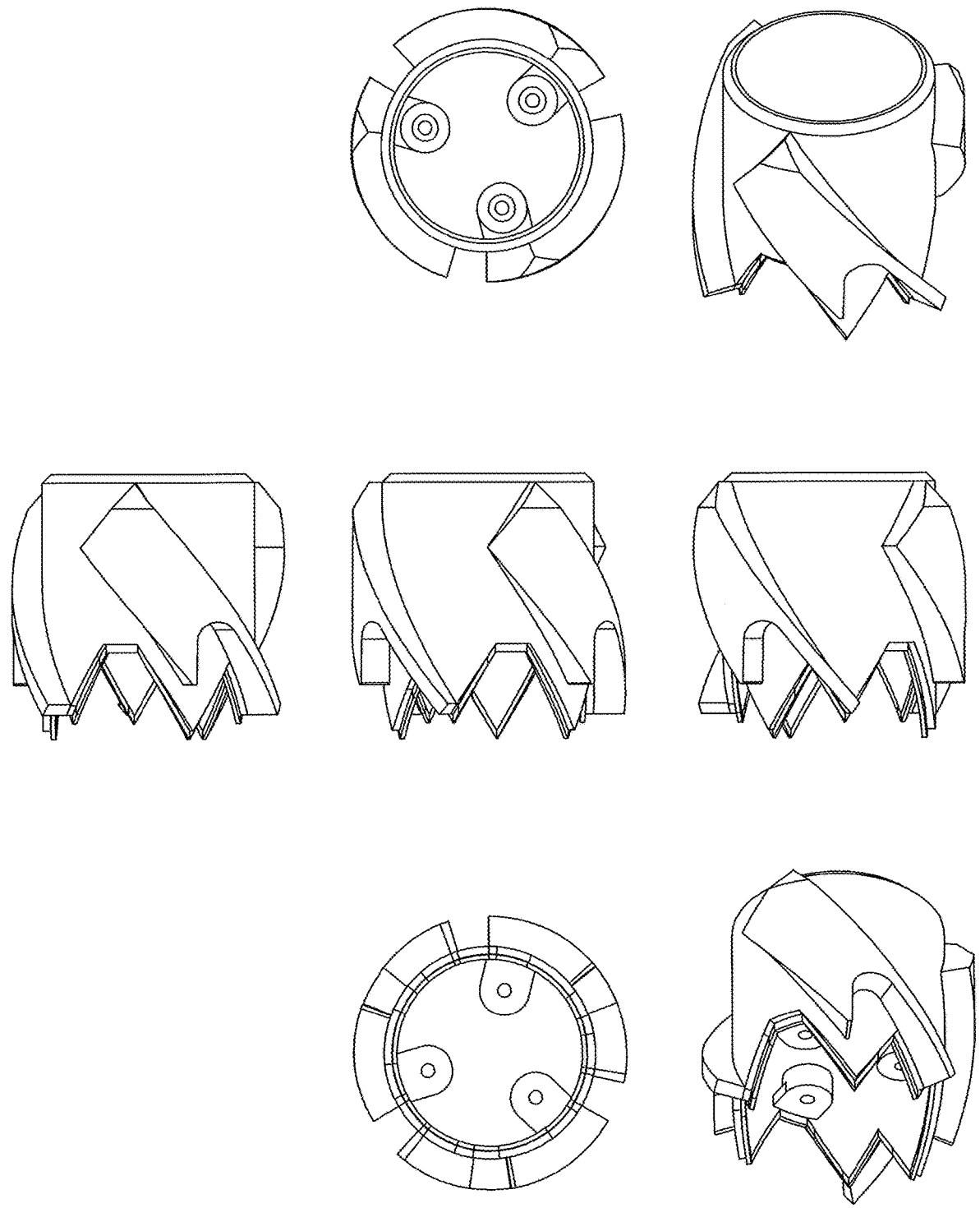

Turning briefly to FIGS. 7B and 7C, illustrated are various different views of the first and second main body portions 715, 720, respectively. The first and second main body portions 715, 720 are specifically designed to be readily and easily manufactured using injection molding. When injection molded, the first and second main body portions 715, 720 may be created using a straight-pull mold. Notwithstanding, the first and second main body portions 715, 720 could additionally be machined on a standard CNC mill, among a number of different manufacturing processes. In an alternative manufacturing method, the male latch member 710 could include a uniform thickness cylindrical member with inserts, such as the inserts 420 discussed above with regard to FIGS. 4A-4C, attached thereto.

Figure 7D:
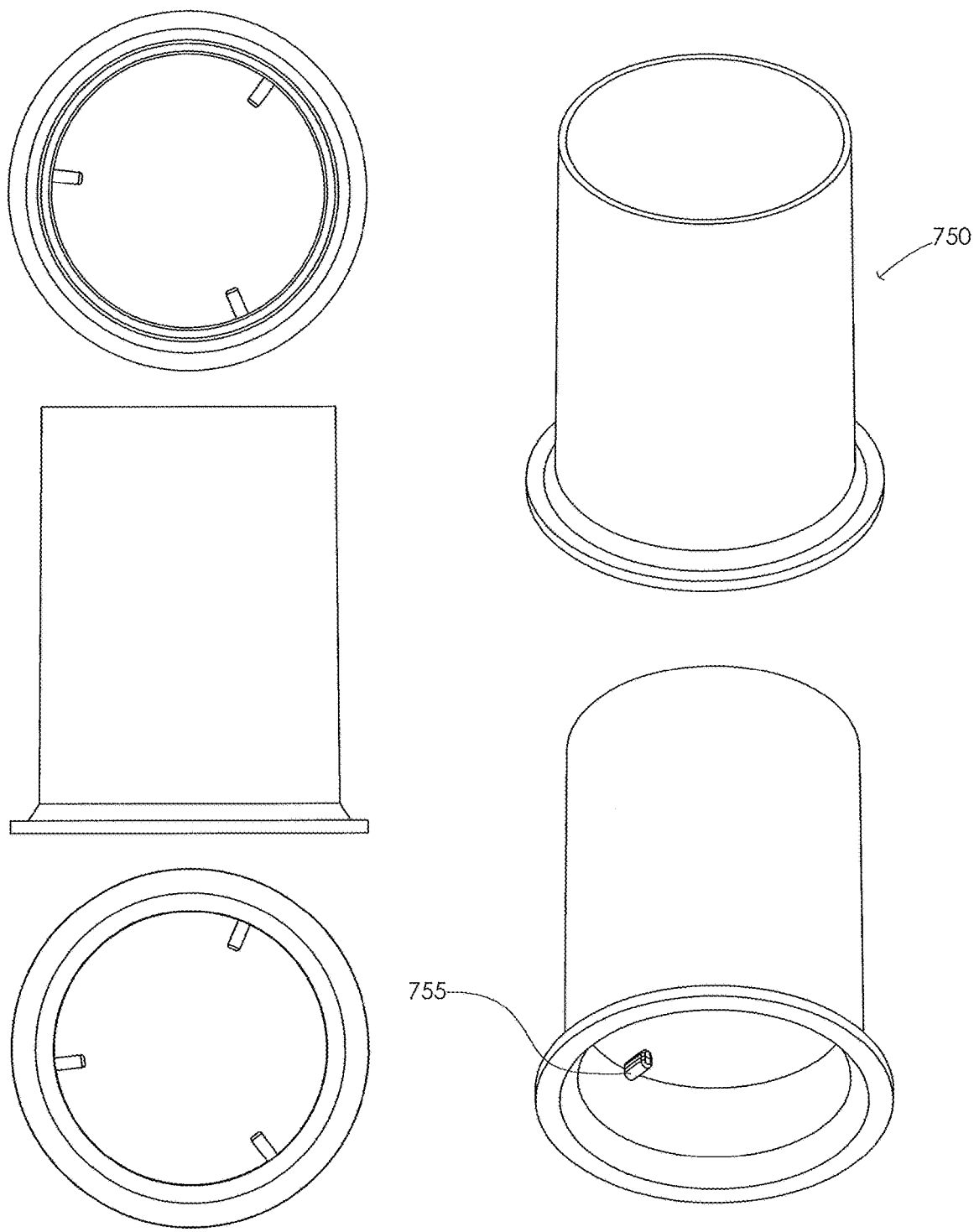

Turning now to FIG. 7D, illustrated are a plurality of different views for the female hook member 750. The female hook member 750, in the embodiment shown, includes a plurality of pins 755 proximate an upper surface thereof. As understood from the discussions above, the one or more pins 755 are configured to follow the cam paths created by the first and second main body portions 715, 720. The female hook member 750, in the embodiment shown, generally takes the shape of a cylinder.

The female hook member 750, similar to the male latch member 710, is specifically designed to be readily and easily manufactured using injection molding. When injection molded, the female hook member 750 may be created using a straight-pull mold. Notwithstanding, the female hook member 750 could additionally be machined on a standard CNC mill, among a number of different manufacturing processes.

Figure 7E:
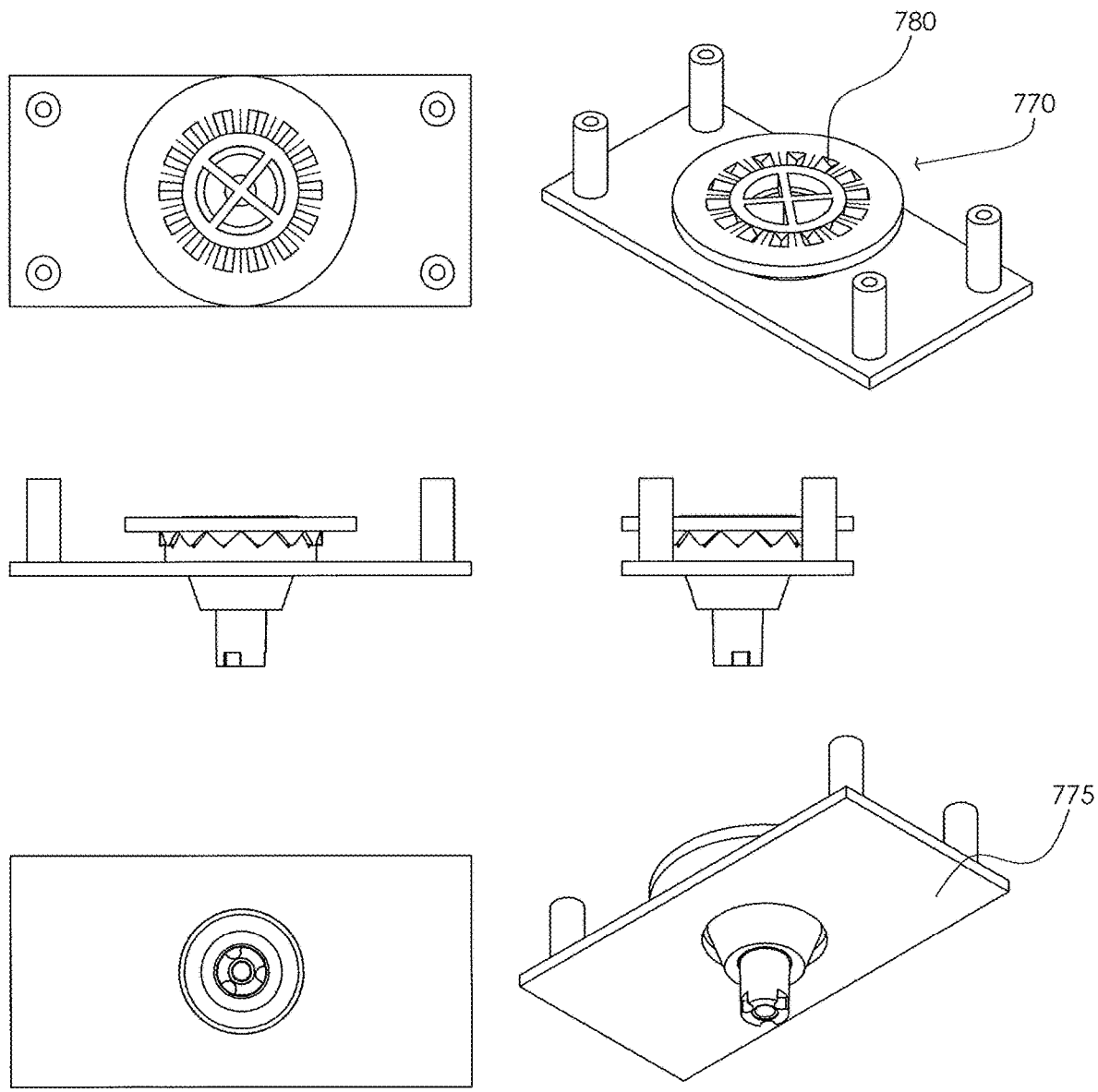

Turning to FIG. 7E, illustrated is a floating bearing assembly 770 in accordance with the disclosure. The floating bearing 770 illustrated in FIG. 7E includes a female floating bearing portion 775 and a male floating bearing portion 780. In the illustrated embodiment, associated angles of the rim of the female floating bearing portion 775 and the shoulder of the male floating bearing portion 780 cause the male floating bearing portion 780 to the center of the female floating bearing portion 775 when under gravity.

Figure 7F:
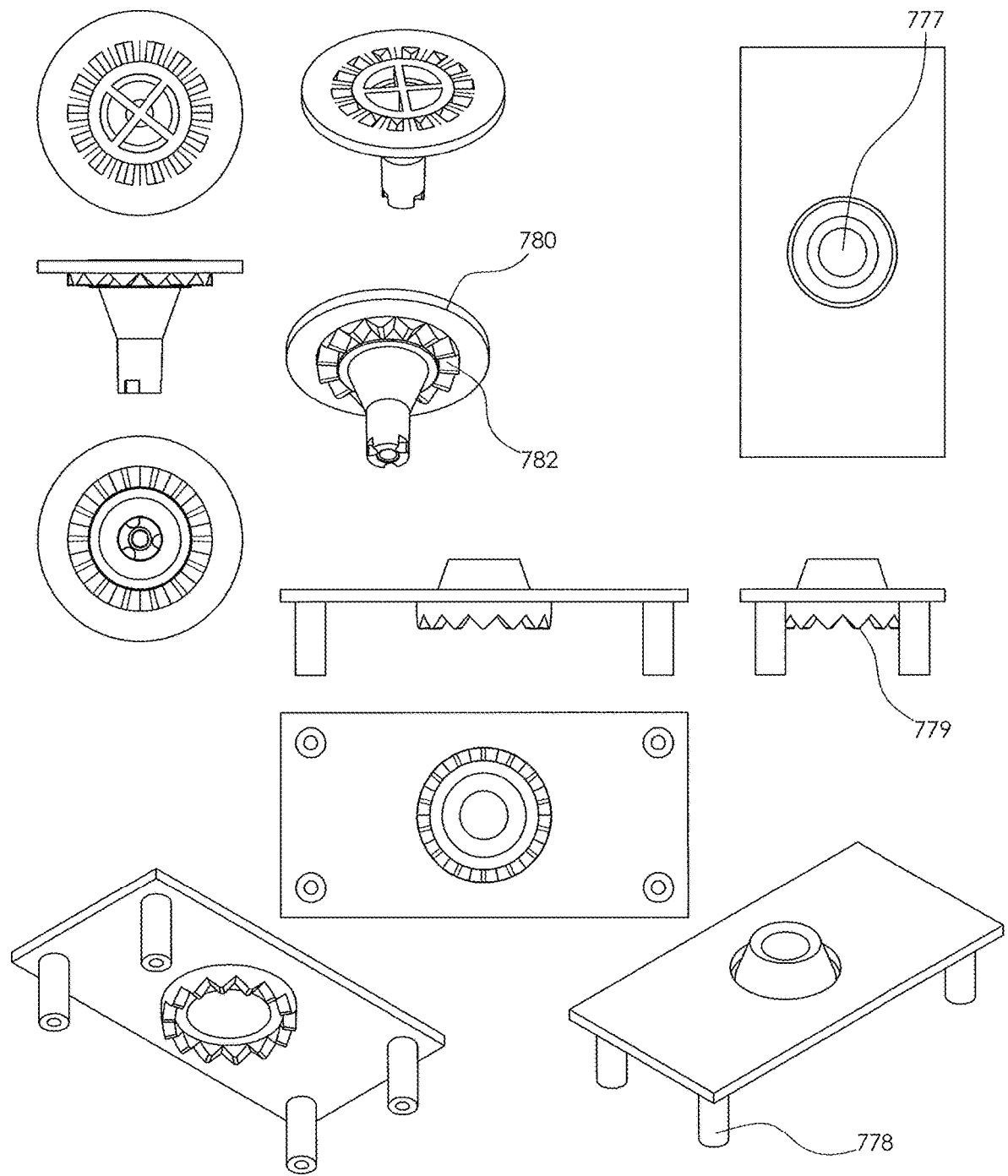

Turning briefly to FIG. 7F, illustrated are various separate views of the female floating bearing portion 775 and the male floating bearing portion 780. As can be readily seen, the female floating bearing portion 775 of the embodiment of FIG. 7F includes a central opening 777 for accepting the male floating bearing portion 780, as well as one or more mounting posts 778. The one or more mounting posts 778 may couple to an operation mechanism, such as a person, a crane, a robot, a drone, etc. One skilled in the art will recognize that the bearing can be mounted to an operating mechanism in a variety of ways other than mounting posts. The female floating bearing portion 775 additionally includes a first friction member 779. In the embodiment of FIG. 7F, the first friction member is a set of teeth. Nevertheless, other friction members are within the purview of the disclosure.

As can also be readily seen, the male floating bearing portion 780 may include the aforementioned shoulder 782 for engaging the central opening 777 in the female floating bearing portion 775. The male floating bearing portion 780 additionally includes a second friction member 782. In the embodiment of FIG. 7F, the second friction member 782 is a second set of teeth, which correspond with the set of teeth of the first friction member 779. Nevertheless, other friction members are within the purview of the disclosure.

The female floating bearing portion 775 and male floating bearing portion 780, similar to many of the other features of the rotating tension latch 700, are specifically designed to be readily and easily manufactured using injection molding. When injection molded, the female floating bearing portion 775 and male floating bearing portion 780 may each be created using a straight-pull mold. Notwithstanding, the female floating bearing portion 775 and male floating bearing portion 780 could additionally be machined on a standard CNC mill, among a number of different manufacturing processes.

Figure 7G:
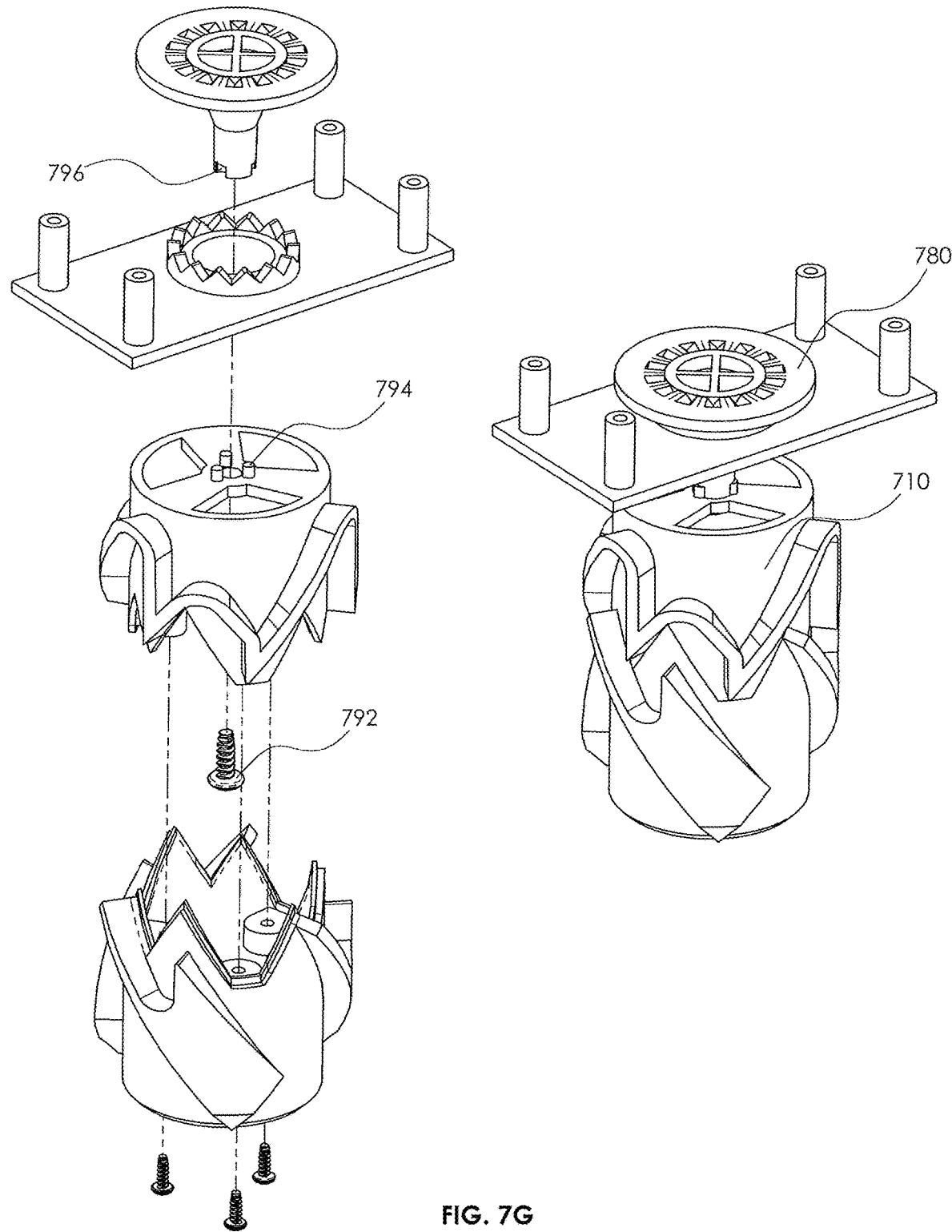

Turning now to FIG. 7G, illustrated is a view of the male latch member 710 attaching to the male floating bearing portion 780. In this embodiment, the male floating bearing portion 780 is attached by a bolt 792. If the male bearing portion 780 is made of plastic, a thread-forming screw can be used. Anti-rotation features such as the pins 794 in the male latch member 710 which mate with the recesses 796 on the male floating bearing portion 780 are beneficial as they prevent torqueing out of the bolt 792 during operation of the rotating tension latch.

Figure 7H:
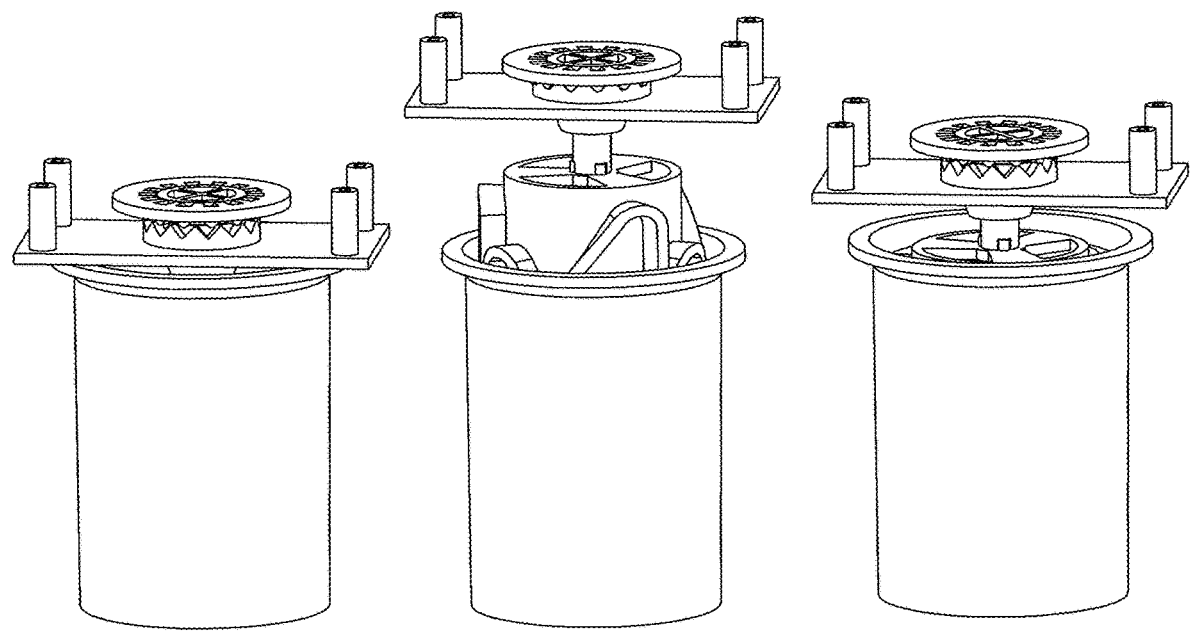

Turning now to FIG. 7H, illustrated is the rotating tension latch 700, including the male latch member 710 and female hook member 750 at various different positions of engagement. For example, the left most depiction illustrates the rotating tension latch 700 at a point when the one or more pins 755 are located at the first upper limit of the male latch member 710. The middle depiction illustrates the rotating tension latch 700 at a point when the one or more pins 755 are located at the lower limit of the male latch member 710. The right most depiction illustrates the rotating tension latch 700 at a point when the one or more pins 755 are located at the second upper limit of the male latch member 710. As is illustrated, the corresponding teeth in the bearing are separated in the left most and right most positions of engagement.

The rotating tension latch features illustrated above with regard to FIGS. 4A through 7H have been discussed as being injection molded. Notwithstanding, other manufacturing processes could be used to create said features. For instance, all of the features listed above can alternatively be machined. In fact, the moldable configurations allow for 1 setup on a 3-axis CNC for the main body and only 2 setups on a 3-axis CNC. Furthermore, instead of snap fits, one could use screws or bolts or be welded or otherwise fused or joined. Similarly, the features could metal cast in a manner very similar to the injection molding. In yet another embodiment, the features may be manufactured using an additive manufacturing process, such as 3D printing, or could be manufactured using an investment casting process. In yet another embodiment, the features may be manufactured using any molding process, including injection molding or reaction molding.

A rotating tension latch system, in accordance with the disclosure, could have many different applications. For example, as briefly discussed above, the rotating tension latch, particularly when used with the screw type male hook member, could be used for surgical procedures. Similarly, the rotating latch system could be used with robotics. As the rotating tension latch technology does not require a separate actuator for lifting and dropping objects, it has a lot of benefits for robotics in terms of simplicity, weight, and energy conservation. A robot or rover could use a latch to drop and pick up payloads. This could be especially useful in hazardous environments (gaseous environments, space, underwater, military). A robot or other operation could also employ more than one latch to prevent rotation and possibly help with maintaining the center of mass. The use of multiple latches requires more precise alignment, but could be beneficial in some applications.

In yet another application, the rotating tension latch system could be used for package delivery. A male hook member for use with a female latch member could be integrated into a package, like a cardboard box. Once the box is assembled, it can be picked up, transported, and dropped off by robots or cranes. For example, an automated product fulfilment center could use the female latch member to transport boxes through the facility. The same male hook member could be used by an automated drone to pick up the package and transport it to the customer.

A female hook member that attaches to a package could include some protection for the latch to enter. The female hook member may need to be more than a ring, otherwise the contents of the package could interfere with the male latch member. If the female hook member were placed in the middle, it could create problems for fitting contents in the package. The female hook member could be placed on one end or in a corner and use spring stabilizers (described later) to position the box in a way that does not create a Center of Mass problem for an operator such as a drone. Another solution would be to have multiple latch members and multiple hook members. With two hook members, each hook member could extend away from the box on opposite ends. This may require specific spacing of the latches and hooks, which means the operator would have to align every time, and the box sizes could be limited. The benefit of a female hook member is that it allows boxes to be stacked, whereas a male hook member would not be as easy to stack. Boxes with male hooks might have to be stacked in an offset pattern so that boxes fit in between the male hooks of the underlying layer of boxes. However, a benefit of a male hook member is that it allows the use of a female latch member, which allows for easier landing of a drone on a flat surface (described below).

Figure 8:
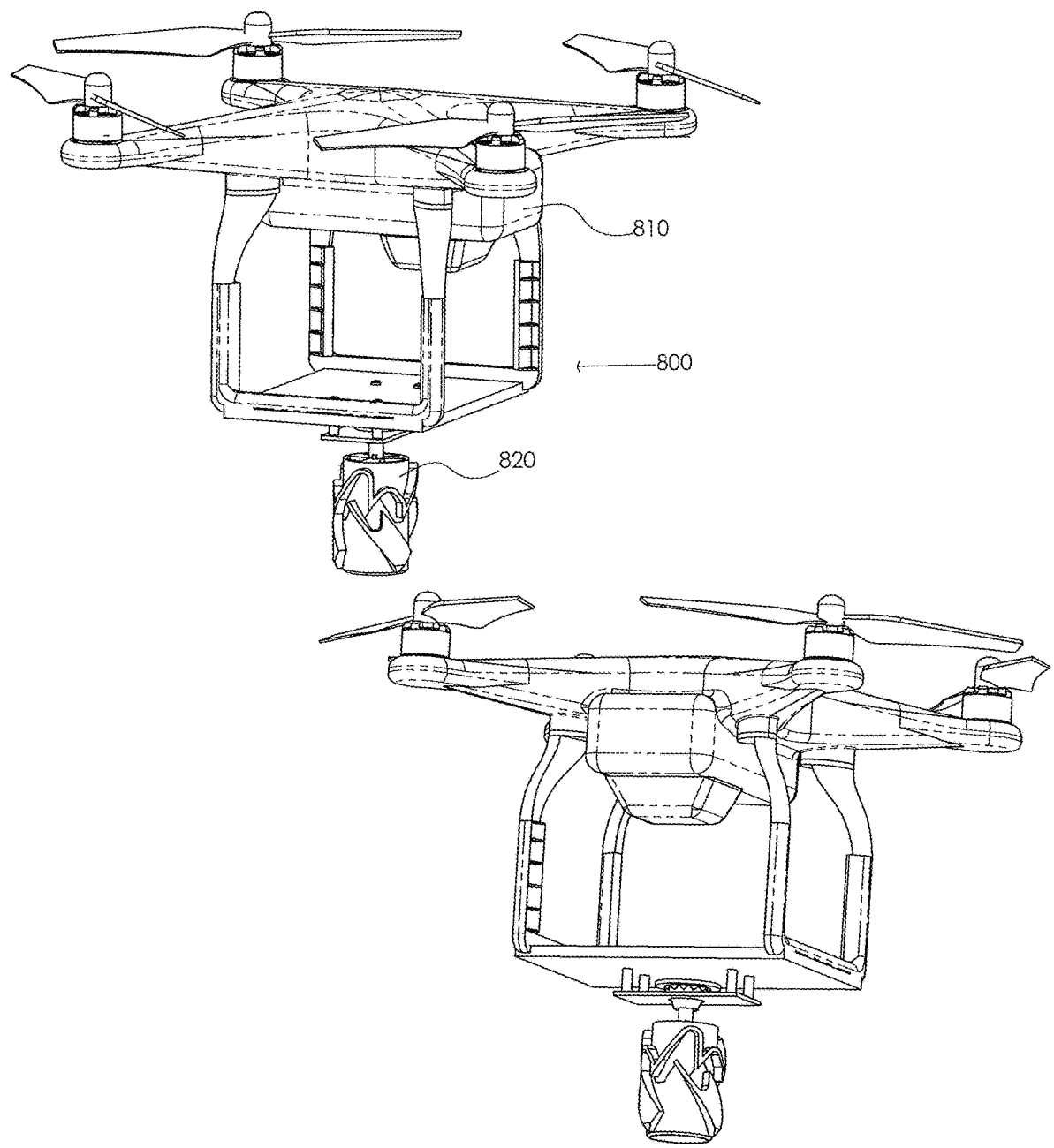
FIG. 8 illustrates a delivery system wherein a drone has a rotating tension latch (e.g., male latch member in this embodiment) attached thereto.

Turning briefly to FIG. 8, illustrated is a delivery system 800 wherein a drone 810 has a rotating tension latch 820 (e.g., male latch member in this embodiment) attached thereto. The delivery system 800 could be used to deliver various different types and/or sizes of packages using the drone 810 and rotating tension latch 820. One possible problem with using the rotating tension latch in applications like drone delivery is that the rotating tension latch itself may not supply sufficient stability to the payload. It could swing or bounce during transport which may not be desirable. One or more spring plungers that put substantially even force around the rotating tension latch on the payload could be used to stabilize the payload.

The spring plungers could be integrated into the drone, robot, or crane arm or into the latch and bearing system itself. One of the springs could be integrated inside the female latch member configuration. Likewise, a cylindrical plunger could be used around the male latch configuration. Multiple springs could be spaced around the latch on the operator to provide better leverage. On a drone, these plungers could be the landing gear as well.

The springs could also provide a downward force to replace gravity in the operation of the rotating tension latch. This would allow the rotating tension latch to be used in zero or low gravity environments. It could also allow the rotating tension latch to be used horizontally or at an angle. So long as the spring force is enough to keep the pins engaged in the appropriate position, the payload can be moved to any angle. The maximum desired or available downward force supplied by the operator must be greater than the maximum force supplied by the sum of the springs when fully engaged. The springs could also help axial alignment, as well as help provide sensor feedback as described below.

A key challenge with using the rotating tension latch for automated drone package delivery is handling the landing gear of the drone. The use of a male latch member requires that the landing pads be spaced far enough apart that the payload can fit between the landing gear. This is because the landing pads must reach below the lowest point of the rotating tension latch, but the package must be allowed to engage with the rotating tension latch. Alternatively, the male latch member could have features that act as a landing point. The latch could be used to reduce the load on the drone's motors, which would only need to provide stability to prevent tipping. The drone could also have landing gear on a side so that it could tip towards the landing gear. The use of a female latch member would not require special landing considerations because the payload's top surface would not have to reach the landing gear. In fact, the landing gear could be used as the spring stabilizers.

Figure 9:
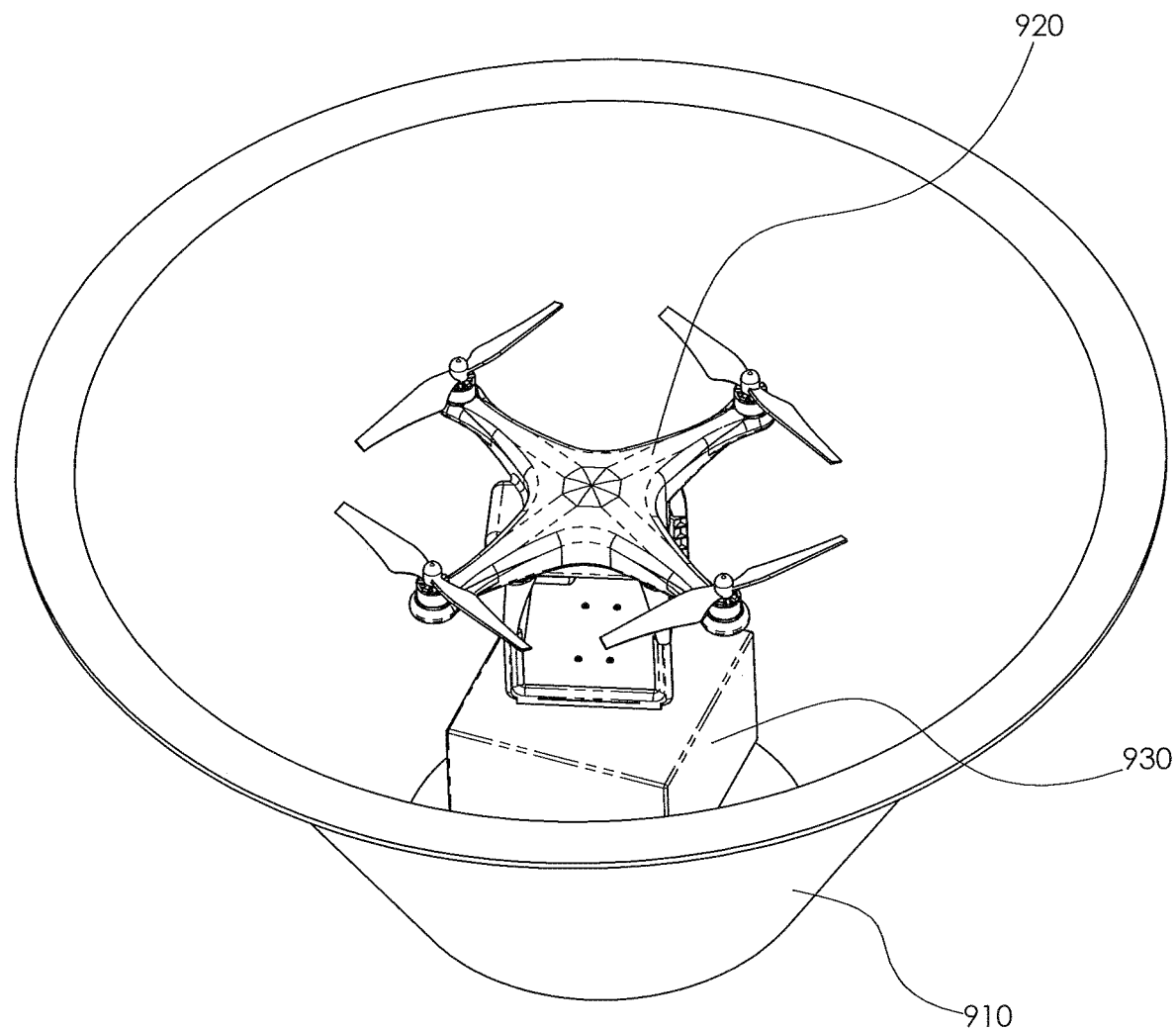
FIG. 9 illustrates a conical air shield, as may be used to reduce the ground effect of a drone.

Ground effect could have a negative impact on a drone's ability to pick up a package automatically. The ground effect will push the drone away from the package (or the drone could push the package away from the drone). A conical air shield 910, as shown in FIG. 9, could help center the drone 920 as it drops down to pick up a package 930. Alternatively, a recess in the ground surface could hold the package so that the ground effect does not push the drone from the package.

In another embodiment, as discussed briefly above, one or more sensors can be used to detect and/or confirm engagement by the rotating tension latch. One or more sensors could sense force to detect the weight increase or decrease from engaging and lifting or disengaging and dropping. In one embodiment, the pins could be used to complete an electrical circuit at certain positions in the contour to communicate the pin location(s) to the operator (human or automated). A similar sensor could be used at the floating bearing. The male part could complete a circuit when in contact with the female part. When they are separated due to an upwards force (presumably because the latch member has gone down as far as possible) it could communicate with the operator (human or automated). This would prevent pushing down too far. The sensors could also be integrated into the rotating tension latch or into the operator. It could be a strain or force gauge within either. In the case of a drone, position, altitude, or acceleration sensors paired with readings of the propeller speeds could be used to determine the pin position with respect to the upper and or lower limits.

In yet another embodiment, lifting lugs could be used in conjunction with the rotating tension latch. For example, if the pins or rollers of the hook member are not strong enough to hold the desired payload, fixed lugs or plates could be used to engage to make a reinforced connection at or near the lower limit. Ideally, this would take the load off of the pins and put it on a reinforced lug.

In even yet different embodiments, alignment mechanisms can be employed to help bring the latch member and hook member together. Several feedback mechanisms can be used to help guide the latch member to align with the hook member. Fiducials or other visual targets can be used to specify the hook location. The feature could be on the actual hook (or be the hook itself) or nearby. In one embodiment, a camera could find the target and the operator (human or automated) could align accordingly. This could be particularly useful on a drone that already has a camera. Alignment could also be aided by other sensors such as some kind of wireless signal (like NFC), a reflective material that could reflect a laser or other light back onto a sensor located on the operator, or other similar idea.

A rotating tension latch, in accordance with the present disclosure, desires to be able to handle many different types of misalignment between the latch member and the hook member. Essentially, the latch member needs to be relatively aligned with the hook member to properly engage. The rotating tension latch design is configured to allow for engagement in the following modes of misalignment. Rotational Misalignment: any angular position of the pins with respect to the peaks of the contours of the latch will lead to successful engagement. The most likely to cause problems would be if the pins were perfectly aligned with the peaks. In this situation, slight deformations in either the latch or the hook, along with angular axial misalignment will allow the latch to engage properly. Axial misalignment: This refers to the latch central axis and the hook central axis not being collinear. In this case, the slopes on the peaks and the slopes of the hook, along with the allowed float of the bearing will allow the latch to engage properly. The amount of allowable linear axial misalignment is determined by the largest inner diameter of the hook opening (in the case of the male latch member).

What is claimed is:

1. A female latch member, comprising:
   a main body having an aperture with a central axis and an inside surface; and
   a first upper portion and second and third lower portions extending radially from the inside surface, the second and third lower portions circumferentially spaced from one another, and axially spaced from the first upper portion, guide and limit surfaces of the second and third lower portions facing respective guide and limit surfaces of the first upper portion that cooperate to form first and second channels, the first and second channels being substantially identically shaped, each of the first and second channels having in order a first vertical upper limit defined between a respective upwardly-sloping guide surface and a first limit surface of the first upper portion, a vertical lower limit defined between a downwardly-sloping guide surface and a second limit surface of a respective lower portion, and a second vertical upper limit defined between a respective upwardly-sloping guide surface and a third limit surface of the first upper portion, the first and second channels configured to receive two related pins of a male hook member and cause the female latch member to rotate relative to the male hook member and to alternate between latched and unlatched configurations as the female latch member reciprocates substantially along the central axis relative to the male hook member, the female latch member and the male hook member configured to temporarily engage one another when latched; and
   a floating bearing assembly attached to the main body, the floating bearing assembly including a first floating bearing portion attached to the main body and a second floating bearing portion configured to be attached to an operational mechanism, the first and second floating bearing portions being rotatably engaged with and suspended from one another, at least one of the first floating bearing portion or the second floating bearing portion having a sloped surface, the sloped surface allowing for rotation and at least one of radial, angular or axial movement of the main body relative to the second floating bearing portion.

2. The female latch member as recited in claim 1, wherein the floating bearing assembly is configured to resist rotation when the two related pins are positioned proximate their associated vertical lower limits.

3. The female latch member as recited in claim 1, wherein the second and third lower portions include two initial transition points (T1, T1'), and further wherein the two initial transition points (T1, T1') each have an additional surface that slopes outward away from the central axis from respective tips of the two initial transition points (T1, T1').

4. A male latch member, comprising:
   a core having a central axis and an outside surface; and
   a first upper portion and second and third lower portions radially extending from the outside surface, the second and third lower portions circumferentially spaced from one another, and axially spaced from the first upper portion, guide and limit surfaces of the second and third lower portions facing respective guide and limit surfaces of the first upper portion that cooperate to form first and second channels, the first and second channels being substantially identically shaped, each of the first and second channels having in order a first vertical upper limit defined between a respective upwardly-sloping guide surface and a first limit surface of the first upper portion, a vertical lower limit defined between a downwardly-sloping guide surface and a second limit surface of a respective lower portion, and a second vertical upper limit defined between a respective upwardly-sloping guide surface and a third limit surface of the first upper portion, the first and second channels configured to receive two related pins of a female hook member and cause the male latch member to rotate relative to the female hook member and to alternate between latched and unlatched configurations as the male latch member reciprocates substantially along the central axis relative to the female hook member, the male latch member and the female hook member configured to temporarily engage one another when latched; and
   a floating bearing assembly attached to the core, the floating bearing assembly including a first floating bearing portion attached to the core and a second floating bearing portion configured to be attached to an operational mechanism, the first and second floating bearing portions being rotatably engaged with and suspended from one another, at least one of the first floating bearing portion or second floating bearing portion having a sloped surface, the sloped surface allowing for rotation and at least one of radial, angular or axial movement of the core relative to the second floating bearing portion.

5. The male latch member as recited in claim 4, wherein the floating bearing assembly is configured to resist rotation when the two related pins are positioned proximate their associated vertical lower limits.

6. The male latch member as recited in claim 4, wherein the second and third lower portions include two initial transition points (T1, T1'), and further wherein the two initial transition points (T1, T1') each have an additional surface that slopes inward toward the central axis from respective tips of the two initial transition points (T1, T1').

7. A pick-and-place system, comprising:
   a first latch member having a central axis and a surface surrounding the central axis;
   a second hook member; and
   a first upper portion and second and third lower portions extending radially from the surface of the first latch member, the second and third lower portions circumferentially spaced from one another, and axially spaced from the first upper portion, guide and limit surfaces of the second and third lower portion facing respective guide and limit surface of the first upper portion that cooperate to form first and second channels, the first and second channels being substantially identically shaped, each of the first and second channels having in order a first vertical upper limit defined between a respective upwardly-sloping guide surface and a first limit surface of the first upper portion, a vertical lower limit defined between a downwardly-sloping guide surface and a second limit surface of a respective lower portion, and a second vertical upper limit defined between a respective upwardly-sloping guide surface and a third limit surface of the first upper portion, the first and second channels configured to receive two related pins of the second hook member and cause the first latch member to rotate relative to the second hook member, wherein the first latch member and the second hook member alternate between latched and unlatched configurations as the first latch member reciprocates substantially along the central axis relative to the second hook member, the first latch member and the second hook member configured to temporarily engage one another when latched; and a floating bearing assembly attached to the first latch member, the floating bearing assembly including a first floating bearing portion attached to the first latch member and a second floating bearing portion configured to be attached to an operational mechanism, the first and second floating bearing portions being rotatably engaged with and suspended from one another, at least one of the first floating bearing portion or second floating bearing portion having a sloped surface, the sloped surface allowing for rotation and at least one of radial, angular or axial movement of the first latch member relative to the second hook member and the second floating bearing portion.

8. The pick-and-place system as recited in claim 7 wherein the first latch member is a female latch member and the second hook member is a male hook member.

9. The pick-and-place system as recited in claim 7, wherein the floating bearing assembly is configured to resist rotation when the two related pins are positioned proximate their associated vertical lower limits.

10. The pick-and-place system as recited in claim 9 wherein the floating bearing assembly includes a toothed surface to resist rotation.

11. The pick-and-place system as recited in claim 9, wherein the floating bearing assembly further includes a spring to avow for rotation when the two related pins are not positioned proximate their associated vertical lower limits.

12. The pick-and-place system as recited in claim 7, wherein the two related pins are evenly distributed.

13. The pick-and-place system as recited in claim 7, further including a spring positioned between the first latch member and second hook member, the spring configured to help maintain the two related pins in their respective vertical lower limits.

14. The pick-and-place system as recited in claim 7, wherein the second floating bearing portion is a female floating bearing portion and the first floating bearing portion is a male floating bearing portion, and further including a sensor associated with the female floating bearing portion and the male floating bearing portion, the sensor configured to assist in determining locations of the two related pins relative to their first vertical upper limits, vertical lower limits, and second vertical lower limits.

15. The pick-and-place system as recited in claim 14 wherein the sensor determines a position of the female floating bearing portion and the male floating bearing portion relative to one another.

16. The pick-and-place system as recited in claim 7, wherein the two related pins have a non-circular cress-section.

17. The pick-and-place system as recited in claim 7, wherein the first latch member includes two initial transition points (T1, T1'), and further wherein the two initial transition points (T1, T1') each have an additional surface that slopes inward toward the central axis from respective tips of the two initial transition points (T1, T1').

18. The pick-and-place system as recited in claim 7, wherein the two related pins are cam rollers.

19. The pick-and-place system as recited in claim 7, further including an operational mechanism comprising an unmanned aerial vehicle attached to the floating bearing assembly.

20. The pick-and-place system as recited in claim 19, wherein the first latch member is coupled to the unmanned aerial vehicle and the second hook member is coupled to a delivery package.

* * * * *